(12) United States Patent
Sano

(10) Patent No.: US 11,959,254 B2
(45) Date of Patent: Apr. 16, 2024

(54) SHOVEL

(71) Applicant: SUMITOMO HEAVY INDUSTRIES, LTD., Tokyo (JP)

(72) Inventor: Yusuke Sano, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 834 days.

(21) Appl. No.: 17/032,433

(22) Filed: Sep. 25, 2020

(65) Prior Publication Data

US 2021/0017738 A1 Jan. 21, 2021

Related U.S. Application Data

(63) Continuation of application No. PCT/JP2019/013014, filed on Mar. 26, 2019.

(30) Foreign Application Priority Data

Mar. 27, 2018 (JP) ................................. 2018-059273

(51) Int. Cl.
  *E02F 9/26* (2006.01)
  *E02F 9/20* (2006.01)
  *G01G 19/12* (2006.01)

(52) U.S. Cl.
  CPC ............ *E02F 9/261* (2013.01); *E02F 9/2029* (2013.01); *E02F 9/264* (2013.01); *G01G 19/12* (2013.01)

(58) Field of Classification Search
  CPC . E02F 9/261; E02F 9/264; E02F 3/437; E02F 3/439; E02F 9/205; E02F 9/2054; E02F 9/262; E02F 9/265; E02F 9/268; E02F 9/2235; E02F 9/2029; E02F 3/435; E02F 9/26; G01G 19/12; H04N 7/183; H04N 7/18
  See application file for complete search history.

(56) References Cited

U.S. PATENT DOCUMENTS

| 5,714,719 | A | 2/1998 | Otsuka et al. | |
| 2007/0010925 | A1* | 1/2007 | Yokoyama | E02F 9/261 37/413 |
| 2011/0309935 | A1 | 12/2011 | Emmett et al. | |
| 2012/0290178 | A1* | 11/2012 | Suzuki | E02F 9/265 701/50 |

(Continued)

FOREIGN PATENT DOCUMENTS

| EP | 3315671 | 5/2018 |
| JP | S59038576 U | 3/1984 |

(Continued)

OTHER PUBLICATIONS

International Search Report for PCT/JP2019/013014 dated May 21, 2019.

*Primary Examiner* — Rachid Bendidi
*Assistant Examiner* — Dana F Artimez
(74) *Attorney, Agent, or Firm* — IPUSA, PLLC

(57) ABSTRACT

A shovel includes a traveling lower body; a revolving upper body rotatably installed on the traveling lower body; an excavation attachment attached to the revolving upper body; and a control device, wherein the control device includes a setting unit to set a target trajectory as a trajectory to be followed by a predetermined part of the excavation attachment, based on information on a landform before excavation is started, and a target excavation volume.

13 Claims, 12 Drawing Sheets

(56) References Cited

U.S. PATENT DOCUMENTS

| | | | | |
|---|---|---|---|---|
| 2015/0276468 A1* | 10/2015 | Jaeger | ................. | G01G 9/00 |
| | | | | 382/154 |
| 2016/0258128 A1* | 9/2016 | Nakamura | ............ | E02F 9/265 |
| 2018/0210454 A1* | 7/2018 | Ready-Campbell | ....................... | |
| | | | | G05D 1/0088 |
| 2020/0217050 A1* | 7/2020 | Chiba | ................. | E02F 9/262 |
| 2020/0380628 A1* | 12/2020 | Futakami | ............ | E02F 9/2054 |

FOREIGN PATENT DOCUMENTS

| | | |
|---|---|---|
| JP | H05-205127 | 8/1993 |
| JP | H06-010378 | 1/1994 |
| JP | H06-089550 | 11/1994 |
| JP | 2000-291076 | 10/2000 |
| JP | 2010-120736 | 6/2010 |
| JP | 2011-252338 | 12/2011 |
| JP | 2012-035973 | 2/2012 |
| JP | 2012-518850 | 8/2012 |
| JP | 2013-002058 | 1/2013 |
| JP | 2016-169571 | 9/2016 |
| JP | 2017-172316 | 9/2017 |
| WO | 2017/002749 | 1/2017 |

* cited by examiner

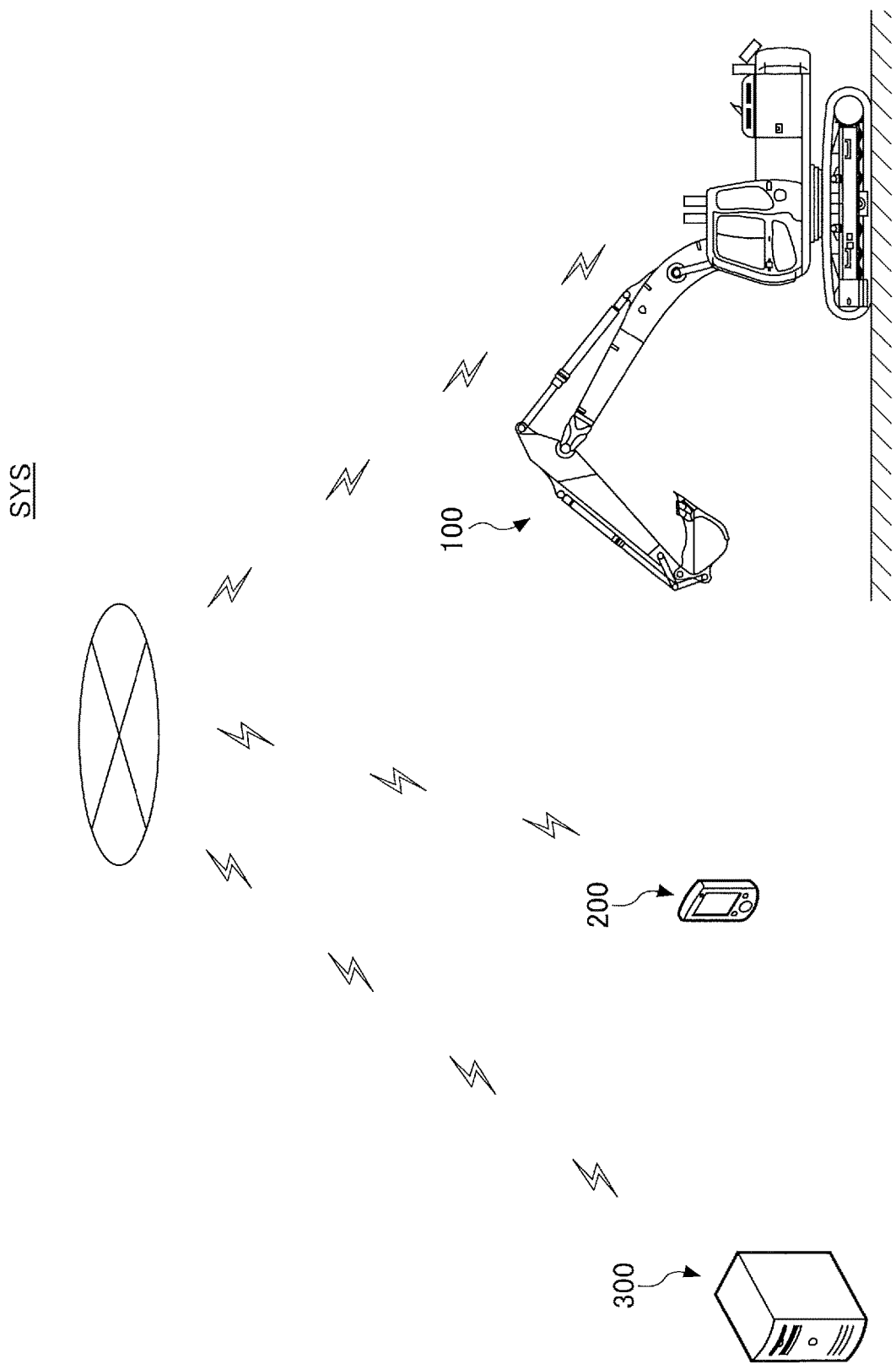

SHOVEL

CROSS-REFERENCE TO RELATED APPLICATION

The present application is a continuation application of International Application No. PCT/JP2019/013014 filed on Mar. 26, 2019, which is based on and claims priority to Japanese Patent Application No. 2018-059273, filed on Mar. 27, 2018. The contents of these applications are incorporated herein by reference in their entirety.

BACKGROUND

Technical Field

The present disclosure relates to a shovel.

Description of Related Art

Conventionally, shovels that are configured to be capable of calculating the weight of earth and sand in the bucket have been known.

However, the shovel described above calculates the weight of earth and sand in the bucket based on the pressure of hydraulic oil in an oil chamber on the bottom side of the boom cylinder. In other words, the weight of earth and sand can only be calculated when bucket is first lifted from the ground. This means that the weight of earth and sand in the bucket cannot be calculated as long as the bucket is in contact with the ground. Therefore, earth and sand may be taken in the bucket more than necessary.

SUMMARY

According an embodiment, a shovel includes a traveling lower body; a revolving upper body rotatably installed on the traveling lower body; an excavation attachment attached to the revolving upper body; and a control device, wherein the control device includes a setting unit to set a target trajectory as a trajectory to be followed by a predetermined part of the excavation attachment, based on information on a landform before excavation is started, and a target excavation volume.

BRIEF DESCRIPTION OF THE DRAWINGS

FIG. 12 is a schematic view illustrating an example of a configuration of a shovel management system.

DETAILED DESCRIPTION

According to an embodiment in the present disclosure, it is possible to provide a shovel that can prevent excavated matter such as earth and sand from being taken in the bucket more than necessary.

Figure 1:
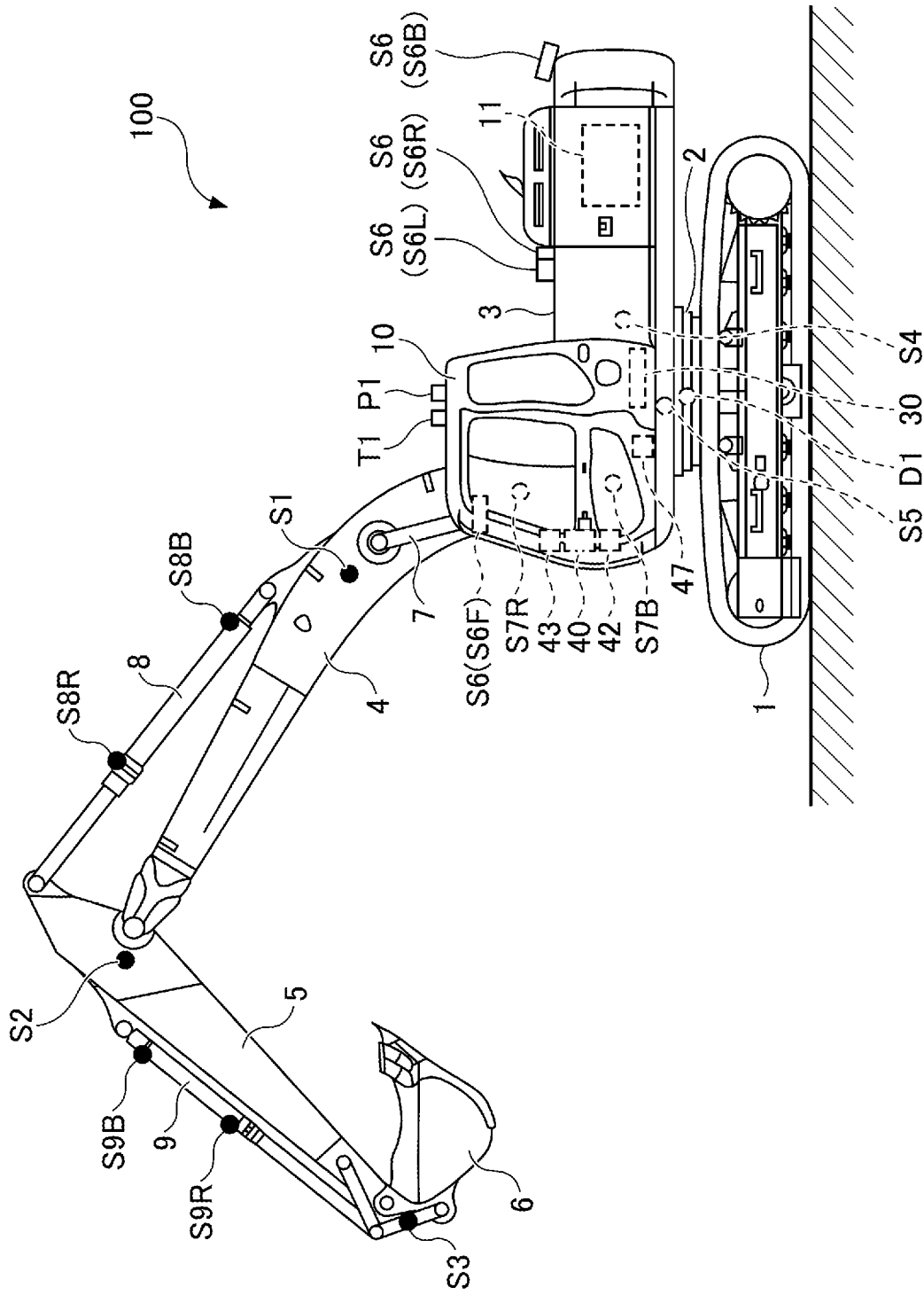
FIG. 1 is a side view of a shovel according to an embodiment in the present disclosure.

FIG. 1 is a side view of a shovel 100 as an excavation machine according to an embodiment in the present disclosure. On a traveling lower body 1 of the shovel 100, a revolving upper body 3 is rotatably installed via a revolution mechanism 2. A boom 4 is attached to the revolving upper body 3; an arm 5 is attached to the tip of the boom 4; and a bucket 6 as an end attachment is attached to the tip of the arm 5.

The boom 4, the arm 5, and the bucket 6 constitute an excavation attachment as an example of an attachment. The boom 4 is driven by a boom cylinder 7, the arm 5 is driven by an arm cylinder 8, and the bucket 6 is driven by a bucket cylinder 9. A boom angle sensor S1 is attached to the boom 4, an arm angle sensor S2 is attached to the arm 5, and a bucket angle sensor S3 is attached to the bucket 6.

The boom angle sensor S1 detects the angle of rotation of the boom 4. In the present embodiment, the boom angle sensor S1 is an acceleration sensor and can detect the angle of rotation of the boom 4 with respect to the revolving upper body 3 (hereafter, referred to as the boom angle). The boom angle becomes the minimum angle, for example, when the boom 4 comes to the lowest position, and becomes greater while the boom 4 is raised to a higher position.

The arm angle sensor S2 detects the angle of rotation of the arm 5. In the present embodiment, the arm angle sensor S2 is an acceleration sensor and can detect the angle of rotation of the arm 5 with respect to the boom 4 (hereafter, referred to as the arm angle). The arm angle becomes the minimum angle, for example, when the arm 5 is closed most, and becomes greater while the arm 5 is opened wider.

The bucket angle sensor S3 detects the angle of rotation of the bucket 6. In the present embodiment, the bucket angle sensor S3 is an acceleration sensor and can detect the angle of rotation of the bucket 6 with respect to the arm 5 (hereafter, referred to as the arm angle). The bucket becomes the minimum angle, for example, when the bucket 6 is closed most, and becomes greater while the bucket 6 is opened wider.

Each of the boom angle sensor S1, the arm angle sensor S2, and the bucket angle sensor S3 may be a potentiometer using a variable resistor; a stroke sensor for detecting a stroke amount of a corresponding hydraulic cylinder; a rotary encoder for detecting an angle of rotation around a coupling pin; a gyro sensor; a combination of an acceleration sensor and a gyro sensor; or the like.

A boom rod pressure sensor S7R and a boom bottom pressure sensor S7B are attached to the boom cylinder 7. An arm rod pressure sensor S8R and an arm bottom pressure sensor S8B are attached to the arm cylinder 8. A bucket rod pressure sensor S9R and a bucket bottom pressure sensor S9B are attached to the bucket cylinder 9. The boom rod pressure sensor S7R, the boom bottom pressure sensor S7B, the arm rod pressure sensor S8R, the arm bottom pressure sensor S8B, the bucket rod pressure sensor S9R, and the bucket bottom pressure sensor S9B are collectively referred to as the "cylinder pressure sensors".

The boom rod pressure sensor S7R detects the pressure of the oil chamber on the rod side of the boom cylinder 7

(hereafter, referred to as the "boom rod pressure"), and the boom bottom pressure sensor S7B detects the pressure of the oil chamber on the bottom side of the boom cylinder 7 (hereafter, referred to as the "boom bottom pressure"). The arm rod pressure sensor S8R detects the pressure of the oil chamber on the rod side of the arm cylinder 8 (hereafter, referred to as the "arm rod pressure"), and the arm bottom pressure sensor S8B detects the pressure of the oil chamber on the bottom side of the arm cylinder 8 (hereafter, referred to as the "arm bottom pressure"). The bucket rod pressure sensor S9R detects the pressure of the oil chamber on the rod side of the bucket cylinder 9 (hereafter, referred to as the "bucket rod pressure"), and the bucket bottom pressure sensor S9B detects the pressure of the oil chamber on the bottom side of the bucket cylinder 9 (hereafter, referred to as the "bucket bottom pressure").

The revolving upper body 3 is provided with a cabin 10 as the driver's cab, and has a power source such as an engine 11 installed. Also, a controller 30, a display device 40, an input device 42, a sound output device 43, a storage device 47, an orientation detection device D1, a positioning device P1, a machine tilt sensor S4, a revolutional angular velocity sensor S5, an imaging device S6, and a communication device T1 are attached to the revolving upper body 3. In the revolving upper body 3, a battery for supplying power and a motor-generator for generating power using the rotational driving power of the engine 11 may be installed. The battery may be, for example, a capacitor or a lithium-ion battery. The motor-generator may function as a generator to feed power to the electric load, or may function as a motor to assist the revolution of the engine 11.

The controller 30 functions as a main control unit to control driving the shovel 100. In the present embodiment, the controller 30 is constituted with a computer that includes a CPU, a RAM, a ROM, and the like. Various functions of the controller 30 are implemented by, for example, the CPU executing a program stored in the ROM. The various functions may include, for example, a machine guidance function of guiding a manual operation of the shovel 100 performed by an operator, a machine control function of autonomously supporting the manual operation of the shovel 100 performed by the operator, and the like.

The display device 40 is configured to display various items of information. The display device 40 may be connected to the controller 30 via a communication network such as a CAN, or may be connected to the controller 30 via dedicated lines.

The input device 42 is configured to allow an operator to input various items of information into the controller 30. The input device 42 may include, for example, at least one of a touch panel, a microphone, a knob switch, and a membrane switch installed in the cabin 10.

The sound output device 43 is configured to output sound. The sound output device 43 may be, for example, a speaker connected to the controller 30 or an alarm such as a buzzer. In the present embodiment, the sound output device 43 is configured to output a sound or voice related to various items of information in response to audio output commands from the controller 30.

The storage device 47 is configured to store various items of information. The storage device 47 may be, for example, a non-volatile storage medium such as a semiconductor memory. The storage device 47 may store information output by various devices during operations of the shovel 100, and may store information obtained via the various devices before operations of the shovel 100 is started. The storage device 47 may store, for example, data obtained via the communication device T1 or the like.

The orientation detection device D1 is configured to detect information on the relative relationship between the orientation of the revolving upper body 3 and the orientation of the traveling lower body 1. For example, the orientation detection device D1 may be constituted with a combination of a geomagnetic sensor attached to the traveling lower body 1 and a geomagnetic sensor attached to the revolving upper body 3. Alternatively, the orientation detection device D1 may be configured with a combination of a GNSS receiver attached to the traveling lower body 1 and a GNSS receiver attached to the revolving upper body 3. The orientation detection device D1 may be a rotary encoder, a rotary position sensor, or the like. In a configuration where the revolving upper body 3 is driven to revolve by a motor-generator for revolution, the orientation detection device D1 may be constituted with a resolver. The orientation detection device D1 may be attached to, for example, a center joint provided in association with the revolution mechanism 2 that implements the relative revolution between the traveling lower body 1 and the revolving upper body 3.

The orientation detection device D1 may be constituted with a camera attached to the revolving upper body 3. In this case, the orientation detection device D1 applies, for example, known image processing to an image (input image) captured by the camera attached to the revolving upper body 3. This is to recognize an image of the traveling lower body 1 included in an input image. Then, once having recognized an image of the traveling lower body 1 using a known image recognition technique, the orientation detection device D1 identifies the longitudinal direction of the traveling lower body 1. Then, the orientation detection device D1 derives an angle formed between the direction of the front-and-back axis of the revolving upper body 3 and the longitudinal direction of the traveling lower body 1. The direction of the front-and-back axis of the revolving upper body 3 is derived from the attached position of the camera. In particular, the crawlers constituting the traveling lower body 1 protrude from the revolving upper body 3; therefore, by detecting an image of the crawlers, the orientation detection device D1 can identify the longitudinal direction of the traveling lower body 1. In this way, the orientation detection device D1 detects information on the relative relationship between the orientation of the revolving upper body 3 and the orientation of the traveling lower body 1. In this case, the orientation detection device D1 may be integrated into the controller 30.

The positioning device P1 is configured to measure the position of the revolving upper body 3. The positioning device P1 may be configured to additionally measure the orientation of the revolving upper body 3. In the present embodiment, the positioning device P1 is a GNSS compass to detect the position and orientation of the revolving upper body 3, and outputs the detected values to the controller 30. Therefore, the positioning device P1 may also function as an orientation detection device to detect the orientation of the revolving upper body 3.

The machine tilt sensor S4 is configured to detect the tilt of the revolving upper body 3, for example, with respect to a predetermined plane. In the present embodiment, the machine tilt sensor S4 is an acceleration sensor to detect the tilt angle around the front-and-back axis and the tilt angle around the right-and-left axis of the revolving upper body 3 with respect to the horizontal plane. The front-and-back axis and the right-and-left axis of the revolving upper body 3 are, for example, orthogonal to each other at the center point of the shovel as a point along the pivot of the shovel 100.

The revolutional angular velocity sensor S5 is configured to detect the revolutional angular velocity of the revolving upper body 3. The revolutional angular velocity sensor S5 may be configured to detect the revolutional angular velocity of the revolving upper body 3. In the present embodiment, the revolutional angular velocity sensor S5 is a gyro sensor. The revolutional angular velocity sensor S5 may be a resolver, a rotary encoder, or the like.

The imaging device S6 is configured to obtain an image in the surrounds of the shovel 100. In the present embodiment, the imaging device S6 includes a forward camera S6F to capture an image of the space in front of the shovel 100; a left camera S6L to capture an image of the space on the left of the shovel 100; a right camera S6R to capture an image of the space on the right of the shovel 100; and a rear camera S6B to capture an image of the space behind the shovel 100.

The imaging device S6 as a surroundings monitoring device is, for example, a monocular camera having an imaging element such as a CCD or CMOS, and outputs a captured image to the display device 40. The imaging device S6 as the surroundings monitoring device may be a LIDAR device, stereo camera, depth image camera, or the like. Also, the imaging device S6 may be configured to calculate the distance from the imaging device S6 or the shovel 100 to a recognized object. In the case of using a millimeter-wave radar, ultrasonic sensor, laser radar, or the like as the surroundings monitoring device, the shovel 100 may not only use captured images, but also transmit a number of signals (such as laser light rays) from the surroundings monitoring device to an object, to receive the reflected signals, so as to derive the distance and direction of the object from the reflected signals.

The forward camera S6F is attached, for example, to the ceiling of the cabin 10, namely, to the inside of the cabin 10. However, the forward camera S6F may be attached to the outside of the cabin 10, such as the roof of the cabin 10 or a side surface of the boom 4. The left camera S6L is attached to the left end on the upper plane of the revolving upper body 3; the right camera S6R is attached to the right end on the upper plane of the revolving upper body 3; and the rear camera S6B is attached to the rear end on the upper plane of the revolving upper body 3.

The communication device T1 is configured to control communication with an external device external to the shovel 100. In the present embodiment, the communication device T1 controls communication with the external device via at least one of a satellite communication network, a cellular telephone communication network, and the Internet.

Figure 2:
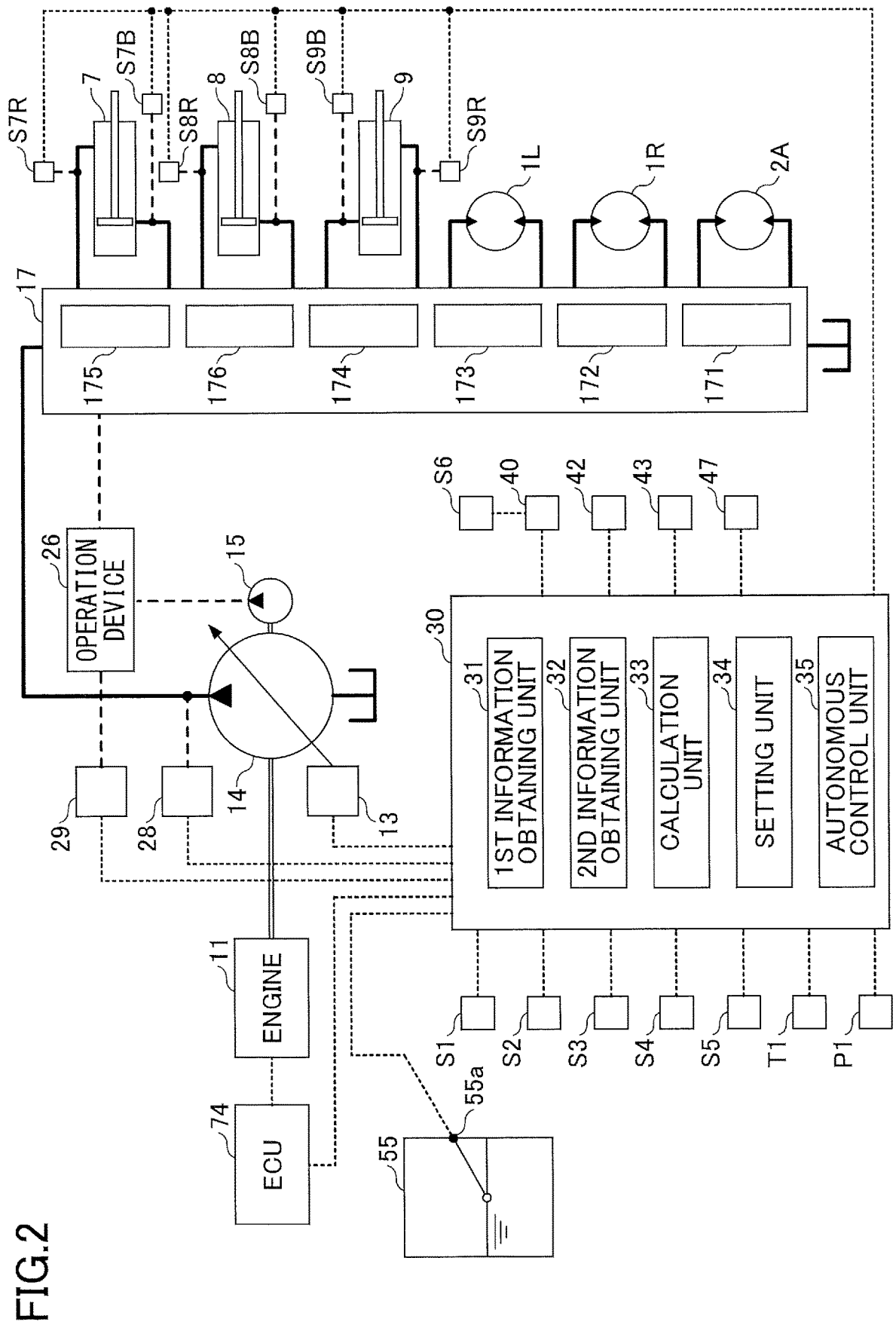
FIG. 2 is a block diagram illustrating an example of a configuration of a driving system of the shovel in FIG. 1.

FIG. 2 is a diagram illustrating an example of a configuration of a driving system of the shovel 100, in which a mechanical power transmission system, hydraulic oil lines, pilot lines, and an electric control system are designated with double lines, solid lines, dashed lines, and dotted lines, respectively.

The driving system of the shovel 100 primarily includes an engine 11, regulators 13, main pumps 14, a pilot pump 15, control valves 17, an operation device 26, discharge pressure sensors 28, operational pressure sensors 29, a controller 30, a fuel tank 55, an engine controller unit (ECU 74), and the like.

The engine 11 is the driving source of the shovel. In the present embodiment, the engine 11 is, for example, a diesel engine that operates to maintain a predetermined number of revolutions. Also, the output shaft of the engine 11 is coupled with the respective input shafts of the main pumps 14 and the pilot pump 15.

The main pump 14 is configured to supply hydraulic oil to the control valves 17 via hydraulic oil lines. In the present embodiment, the main pump 14 is a swashplate-type, variable-capacity hydraulic pump.

The regulator 13 is configured to control the discharge amount of the main pump 14. In the present embodiment, according to a control command from the controller 30, the regulator 13 adjusts the tilt angle of the swashplate of the main pump 14, to increase or decrease the displacement volume per revolution, so as to control the discharge amount of the main pump 14. For example, the controller 30 receives outputs from the operating pressure sensors 29, and when necessary, outputs a control command to the regulator 13 to change the amount of discharge of the main pump 14.

The pilot pump 15 is configured to supply hydraulic oil to various hydraulic control devices including the operation device 26 via the pilot lines. In the present embodiment, the pilot pump 15 is a fixed-capacity hydraulic pump. However, the pilot pump 15 may be omitted. In this case, the functions implemented by the pilot pump 15 may be implemented by the main pumps 14. In other words, in addition to the function of supplying hydraulic oil to the control valves 17, the main pumps 14 may include a function of supplying hydraulic oil to the operation device 26 and the like after lowering the pressure of the hydraulic oil by a throttle or the like.

The control valves 17 constitute a hydraulic control device that controls the hydraulic system in the shovel. The control valves 17 include control valves 171 to 176. The control valves 17 can selectively supply hydraulic oil discharged by the main pumps 14 to one or more hydraulic actuators through the control valves 171 to 176. The control valves 171 to 176 control the flow rate of the hydraulic oil flowing from the main pumps 14 to the hydraulic actuators, and the flow rate of the hydraulic oil flowing from the hydraulic actuators to the hydraulic oil tank. The hydraulic actuators include the boom cylinder 7, the arm cylinder 8, the bucket cylinder 9, a left hydraulic motor for traveling 1L, a right hydraulic motor for traveling 1R, and a hydraulic motor for revolution 2A. The hydraulic motor for revolution 2A may be a motor-generator for revolution as an electric actuator. In this case, the revolution motor-generator may receive power supplied from a battery or a motor-generator.

The operation device 26 is a device used by the operator for operating the actuators. The actuators include at least one of a hydraulic actuator and an electric actuator. In the present embodiment, the operation device 26 supplies, via the pilot lines, hydraulic oil discharged by the pilot pump 15 to the pilot port of a corresponding control valve among the control valves 17. The pressure (pilot pressure) of the hydraulic oil supplied to each of the pilot ports is a pressure, in principle, depending on the operational direction and the operational amount of the operation device 26 corresponding to each of the hydraulic actuators.

The discharge pressure sensors 28 are configured to detect the discharge pressure of the main pumps 14. In the present embodiment, the discharge pressure sensors 28 output the detected values to the controller 30.

The operational pressure sensors 29 are configured to detect the contents of an operation performed by the operator on the operation device 26. In the present embodiment, each of the operational pressure sensors 29 detects the operational direction and the operational amount of the operation device 26 corresponding to one of the actuators in the form of pressure and outputs the detected value to the controller 30. The contents of an operation on the operation device 26 may be detected using sensors other than the operational pressure sensors.

The fuel tank 55 is a container to contain the fuel. The state of the remaining quantity of the fuel contained in the fuel tank 55 is detected by the remaining fuel quantity sensor 55a. The remaining fuel quantity sensor 55a outputs information on the state of the remaining quantity of the fuel to the controller 30.

The ECU 74 is a device to control the engine 11. In the present embodiment, the ECU 74 controls the amount of fuel injection, the timing of fuel injection, the boost pressure, and the like in the engine 11. Also, the ECU 74 outputs information on the engine 11 to the controller 30.

Next, the functional elements included in the controller 30 will be described. In the present embodiment, the controller 30 includes, as the functional elements, a first information obtaining unit 31, a second information obtaining unit 32, a calculation unit 33, a setting unit 34, and an autonomous control unit 35.

The first information obtaining unit 31 is configured to obtain information on the maximum loadable capacity of a dump truck. The dump truck is an example of a machine that carries excavated matter such as earth and sand excavated by the shovel 100, and the maximum loadable capacity, which is the maximum weight of excavated matter that can be loaded onto the bet, is set individually. In the present embodiment, the first information obtaining unit 31 applies known image processing to an image of a dump truck obtained by the imaging device S6, to identify the size of the dump truck so as to derive the maximum loadable capacity of the dump truck. The first information obtaining unit 31 may recognize, for example, at least one of the display of the maximum loadable capacity, the model name, and the number on the rear surface of the dump truck, to derive the maximum loadable capacity of the dump truck.

The first information obtaining unit 31 may derive the maximum loadable capacity of the dump truck by receiving the identification information from the dump truck through the communication device T1. The identification information is, for example, the identification number of a GNSS receiver installed in the dump truck. In this case, the first information obtaining unit 31 may derive the maximum loadable capacity, for example, from the identification information by referring to a search table that stores the corresponding relationship between the identification information and the maximum loadable capacity. The search table may be stored in a non-volatile recording medium of the shovel, or may be stored in a server or the like installed in an external facility such as a management center.

The first information obtaining unit 31 may receive positional information from each of multiple dump trucks present in the surrounds of the shovel 100 through the communication device T1, and superimpose a figure representing each dump truck on a map image displayed on the display device 40. In this case, once one of the figures of the dump trucks is selected by the operator through the input device 42, the first information obtaining unit 31 can obtain the maximum loadable capacity of the dump truck. One of the figures of the dump trucks may be, for example, a figure of a dump truck that is present most closely. In this case, a figure among the dump trucks may be selected automatically.

The second information obtaining unit 32 is configured to obtain information on the excavation weight, which is the weight of matter excavated in an excavation operation using the excavation attachment. In the present embodiment, the second information obtaining unit 32 is configured to obtain information on the excavation weight based on the output of an information obtainment device. The information obtainment device includes at least one of the orientation detection device D1, the boom angle sensor S1, the arm angle sensor S2, the bucket angle sensor S3, the machine tilt sensor S4, the revolutional angular velocity sensor S5, the imaging device S6, the boom rod pressure sensor S7R, the boom bottom pressure sensor S7B, the arm rod pressure sensor S8R, the arm bottom pressure sensor S8B, the bucket rod pressure sensor S9R, the bucket bottom pressure sensor S9B, the discharge pressure sensors 28, and the operating pressure sensors 29.

Figure 3:
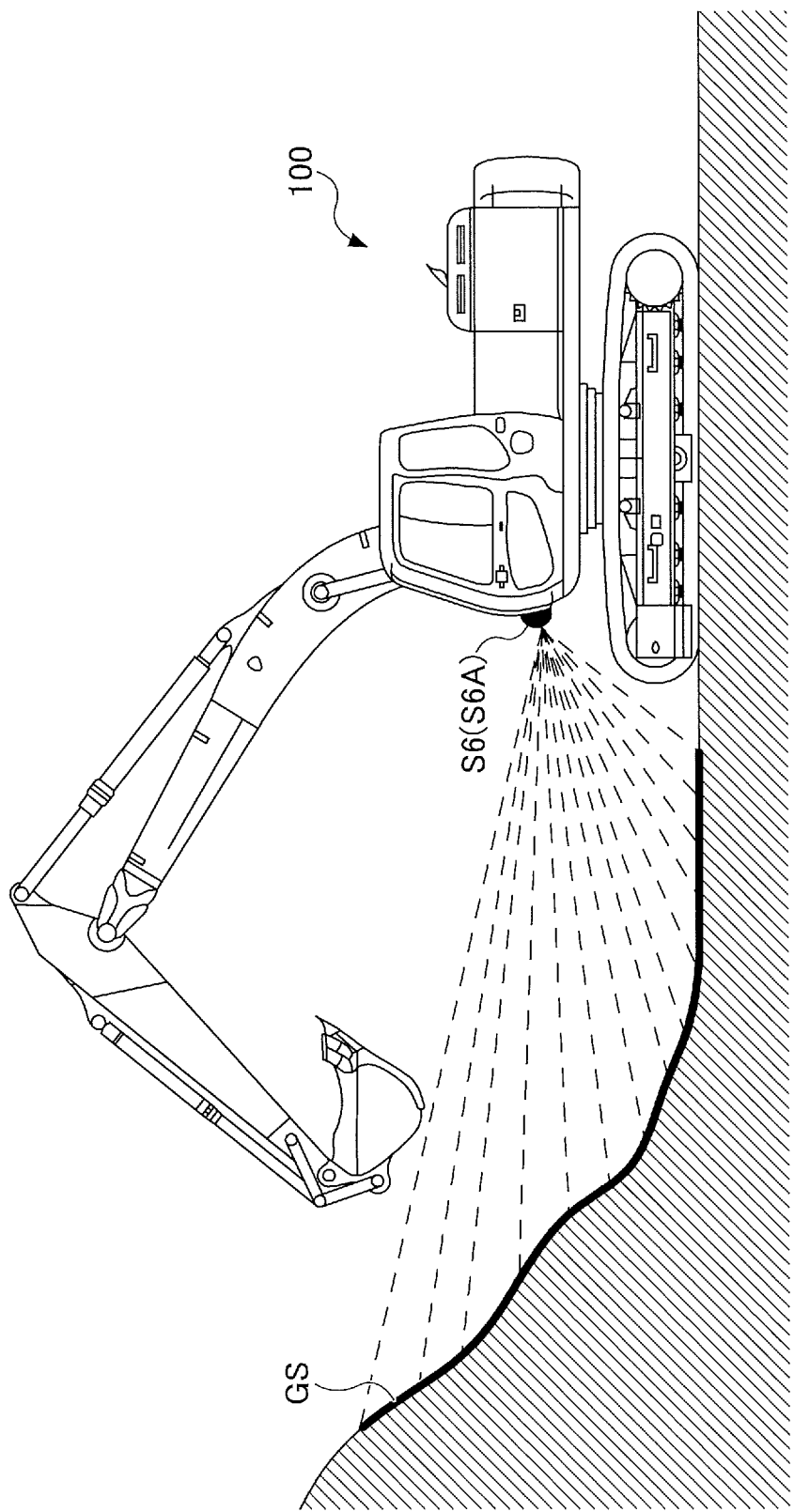
FIG. 3 is a side view of a shovel.

The second information obtaining unit 32 calculates, as the excavation weight, the weight of excavated matter such as earth and sand excavated by an excavation attachment, based on, for example, a depth image of the space in front of the shovel 100 captured by the three-dimensional depth image sensor S6A as the imaging device S6, as illustrated in FIG. 3. A thick line GS in FIG. 3 represents part of the imaging range of the three-dimensional depth image sensor S6A. The three-dimensional depth image sensor S6A is, for example, a three-dimensional laser scanner to measure a landform with laser. Alternatively, the three-dimensional depth image sensor S6A may be, for example, a LIDAR device or a stereo camera. Specifically, the second information obtaining unit 32 calculates an excavation volume, which is the volume of the matter excavated in an individual excavation operation, based on a depth image captured before the excavation operation is started and a depth image captured after the excavation operation is completed. Then, the second information obtaining unit 32 calculates the excavation weight by multiplying the excavation volume by a density. The density may be a value set in advance, or may be a value dynamically set via the input device 42 or the like.

In this way, the second information obtaining unit 32 compares the landform before the excavation with the landform after the excavation, and based on the change, can calculate the excavation weight in an individual excavation operation. An individual excavation operation is an operation to take excavated matter in the bucket 6, for example, which is determined as started when the bucket 6 that has not yet taken in the excavated matter touches the ground, and is determined as completed when the bucket 6 that has taken in the excavated matter leaves the ground. However, the condition for determining that an excavation operation has been started and the condition for determining that the excavation operation has been completed can be set discretionarily. The second information obtaining unit 32 may determine whether the excavation operation has been started and whether the excavation operation has been completed, based on, for example, at least one of the outputs of the operating pressure sensors 29, the cylinder pressure sensors, and the like.

The second information obtaining unit 32 may determine whether the excavation operation has been started and whether the excavation operation has been completed, based on the outputs of position sensors that detect a position of the excavation attachment. The position sensors include, for example, the boom angle sensor S1, the arm angle sensor S2, and the bucket angle sensor S3. The position sensors may be a combination of a boom cylinder stroke sensor, an arm cylinder stroke sensor, and a bucket cylinder stroke sensor.

With this configuration, the controller 30 can calculate an added-up value of the weight of the excavated matter related to one or more excavation operations performed within a predetermined period of time, as a cumulative excavation weight over the predetermined period of time.

The second information obtaining unit 32 may calculate the excavation weight in an individual excavation operation, based on the outputs of the position sensors, the cylinder pressure sensors, and the like.

For example, the second information obtaining unit 32 may calculate as the excavation weight the weight of matter excavated in an individual excavation operation, based on the position of the excavation attachment and the boom bottom pressure when the bucket 6 that has taken in the excavated matter is lifted up in the air.

Figure 4:
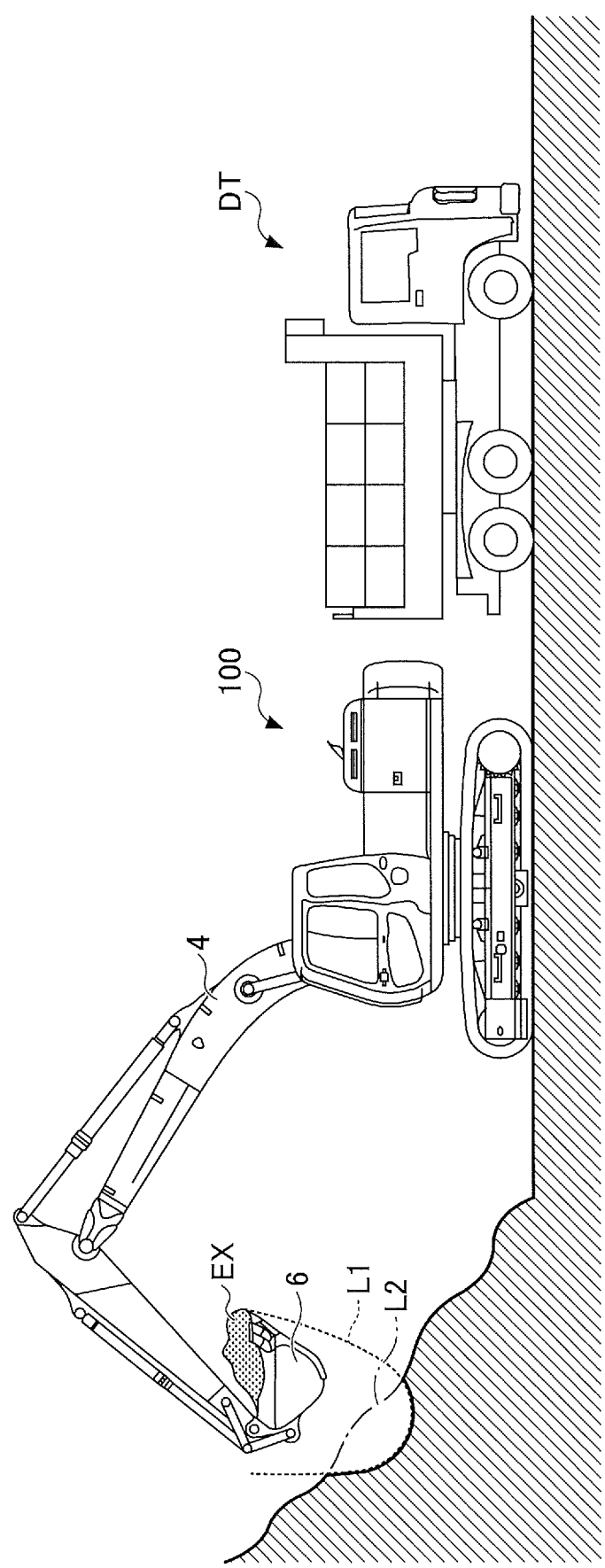
FIG. 4 is a side view of a shovel.

The second information obtaining unit 32 may calculate the excavation weight based on the transition in time of the position of a predetermined part of the bucket 6, as illustrated in FIG. 4. The predetermined part of the bucket 6 is, for example, the teeth end of the bucket 6. The second information obtaining unit 32 calculates the position of the teeth end of the bucket 6 as an operational member, based on, for example, the angle of rotation of each of the boom 4, the arm 5, and the bucket 6.

In this case, the second information obtaining unit 32 derives the landform before the excavation operation is started, for example, based on a depth image of the space in front of the shovel 100 generated by the three-dimensional depth image sensor installed on a flying object. The three-dimensional depth image sensor installed on the flying object may be any one of a three-dimensional laser scanner, a stereo camera, a LIDAR device, and the like. The flying object is, for example, a multicopter, airship, or the like equipped with a positioning device so as to be capable of identifying the position and orientation of the depth image. The flying object is also equipped with a communication device to communicate with the shovel 100.

For example, the second information obtaining unit 32 receives a depth image generated by a stereo camera attached to the flying object through the communication device T1, and derives a landform before the excavation operation is started based on the depth image. The second information obtaining unit 32 may be configured to receive a depth image captured by the stereo camera through the communication device T1, generate a depth image from the image, and derive a landform before the excavation operation is started based on the depth image.

Thereafter, for example, the second information obtaining unit 32 may calculate the excavation volume based on a calculated trajectory of the position of the teeth end of the bucket 6 (dotted line L1 in FIG. 4) and the landform (dashed line L2 in FIG. 4) before the excavation operation is started. The second information obtaining unit 32 may calculate as the excavation volume, for example, the volume of a space surrounded by a plane including the left end face of the bucket 6, a plane including the right end face of the bucket 6, an upper surface including the dashed line L2, and a lower surface including the dotted line L1.

The second information obtaining unit 32 may calculate the excavation weight in an individual excavation operation, based on an image of the space in front of the shovel 100 captured by the forward camera S6F.

In this case, the forward camera S6F may be a monocular camera, may be a stereo camera, or may be a three-dimensional depth image sensor.

The second information obtaining unit 32 may calculate the excavation volume, for example, from an image related to the bucket 6 captured by the forward camera S6F as a monocular camera. Specifically, the second information obtaining unit 32 recognizes an image of excavated matter in the bucket 6 by applying various types of image processing to the image related to the bucket 6 captured by the forward camera S6F when the bucket 6 that has taken in the excavated matter is lifted up in the air. Then, the second information obtaining unit 32 derives the excavation volume based on, for example, the size or the like of the excavated matter in the image. In order to derive the excavation volume, the second information obtaining unit 32 may additionally use the outputs of other information obtainment devices such as the position sensors.

Alternatively, the second information obtaining unit 32 may use the forward camera S6F as a stereo camera, to calculate the excavation weight in an individual excavation operation, based on information on the landform obtained before the excavation operation is started and the information on the landform obtained after the excavation operation is completed.

The second information obtaining unit 32 may be configured to obtain information on the density of matter excavated by an excavation operation using the excavation attachment. In this case, the second information obtaining unit 32 may calculate the density based on the excavation volume and the excavation weight. The excavation volume may be calculated based on, for example, the landform before the excavation operation is started and the landform after the excavation operation is completed. The excavation weight may be calculated, for example, based on the outputs of the cylinder pressure sensors, or may be calculated based on the outputs of the position sensors and the outputs of the cylinder pressure sensors.

The calculation unit 33 is configured to calculate a remaining loadable weight based on information on the maximum loadable capacity and information on the excavation weight. The remaining loadable weight means a weight of excavated matter that can be further loaded onto a dump truck. For example, in the case where 5 tons of excavated matter have already been loaded onto the bed of a dump truck having a maximum loadable capacity of 10 tons, the remaining loadable weight as the target excavation weight, which is the weight of excavated matter to be loaded onto the bucket 6 in excavation operations, is 5 tons. In the present embodiment, the calculation unit 33 calculates the remaining loadable weight based on the information on the maximum loadable capacity of the dump truck obtained by the first information obtaining unit 31, and the information on the excavation weight obtained by the second information obtaining unit 32. Then, the calculation unit 33 calculates the target excavation volume based on the remaining loadable weight and soil information. The soil information is, for example, information on the density, type, hardness, or the like of excavated matter. The soil information may be information stored in advance in the storage device 47. Thereafter, the calculation unit 33 derives an excavation trajectory based on the information on the landform before the excavation is started, and the target excavation volume.

The setting unit 34 is configured to set a target trajectory, which is a trajectory to be followed by a predetermined part of the bucket 6. The predetermined part of the bucket 6 is, for example, the teeth end of the bucket 6. In the present embodiment, the setting unit 34 is configured to set the target trajectory in the case where the remaining loadable weight becomes less than a predetermined weight. The target trajectory may be constituted with, for example, multiple three-dimensional coordinate points that are arranged to have equidistant intervals. The predetermined weight is, for example, the maximum weight of excavated matter that can be excavated in an individual excavation operation (hereafter, referred to as the "maximum excavation weight"), which may be stored in advance in the non-volatile storage medium or the like, or may be set dynamically. The setting unit 34 sets the target trajectory, for example, so as to make the excavation weight in an individual excavation operation equivalent to the remaining loadable weight. The individual excavation operation here is typically the last excavation operation in the case where multiple excavation operations are performed to load excavated matter on the bed of a dump truck to reach the maximum loadable capacity. This is to make the total weight of the excavated matter loaded onto the dump truck virtually equivalent to the maximum loadable capacity, when the excavated matter is loaded onto the dump truck by the last excavation operation. The trajectory designated with the dotted line L1 in FIG. 4 illustrates an example of a target trajectory. The excavation weight, which is the weight of excavated matter EX taken in the bucket 6 by an excavation operation following this target trajectory, is virtually equivalent to the remaining loadable weight. Therefore, the total weight of the excavated matter loaded onto the dump truck virtually equivalent to the maximum loadable capacity, when the excavated matter EX is loaded onto the dump truck. In this way, the setting unit 34 sets the target trajectory so as to restrict the excavation weight in the case where the remaining loadable weight is less than the maximum excavation weight.

Specifically, the setting unit 34 generates multiple excavation trajectories based on the landform before the last excavation operation is performed. Then, based on the landform before the last excavation operation is performed and the multiple excavation trajectories, the setting unit 34 calculates the excavation weight by the last excavation operation for each of the multiple excavation trajectories. The setting unit 34 selects from among the multiple excavation trajectories an excavation trajectory with which the calculated excavation weight becomes equivalent to the required residual weight by the last excavation operation. In this way, the setting unit 34 can set the selected excavation trajectory as the target trajectory.

The setting unit 34 may be configured to set the target trajectory, regardless of whether the remaining loadable weight is less than the predetermined weight. In this case, when necessary, the setting unit 34 may reset the target trajectory before each excavation operation is performed so that the excavation weight by the excavation operation becomes less than the predetermined weight. This is to ensure that appropriate excavation operations are performed in response to, for example, changes in the shape of excavated matter such as a mound. Specifically, in the case where each excavation weight operation is performed without restriction so as to make the excavation weight by the excavation operation become as large as possible, there is a likelihood that the variation of the excavation weight among the excavation operations becomes great; therefore, the resetting as above is performed to prevent such unrestricted excavation operations from being performed. Alternatively, in some cases, there is a likelihood that it becomes necessary to accumulate excavated matter in multiple excavation operations before a single earth removal operation is performed onto the bed of the dump truck DT; therefore, the resetting as above is performed to prevent such unrestricted excavation operations from being performed. Therefore, the setting unit 34 may reset the target trajectory before each excavation operation is performed so that the variation of the excavation weight becomes as small as possible, or so that the average excavation weight becomes as large as possible.

The setting unit 34 may calculate the remaining loadable volume based on information on the density of the excavated matter EX obtained by the second information obtaining unit 32 and the remaining loadable weight, to set the target trajectory so as to excavate the excavated matter EX having a volume equivalent to the remaining loadable volume in the last individual excavation operation. In this way, in the case where the remaining loadable volume is less than the maximum excavation volume, the setting unit 34 may set the target trajectory so as to restrict the excavation volume. Note that the maximum excavation volume is the maximum volume of excavated matter that can be excavated in an individual excavation operation.

The autonomous control unit 35 is configured to autonomously support a manual operation of the shovel 100 performed by the operator, by causing the actuators to operate autonomously. For example, the autonomous control unit 35 may cause at least one of the boom cylinder 7, the arm cylinder 8, and the bucket cylinder 9 to extend or contract autonomously, so that the trajectory of the teeth end of the bucket 6 becomes equivalent to the target trajectory when the operator manually performs an arm-closing operation. In this case, for example, by simply operating the arm operation lever in the closing direction, the operator can close the arm 5 while making the trajectory of the teeth end of the bucket 6 equivalent to the target trajectory. This autonomous control may be configured to executed when a predetermined switch as one part of the input devices 42 is pressed down. The predetermined switch may be, for example, a machine control switch (hereafter, referred to as the "MC switch") arranged at the tip of the operating device 26 as a knob switch.

In the present embodiment, by individually and autonomously adjusting the pilot pressure acting on a control valve corresponding to each of the actuators, the autonomous control unit 35 can cause each of the actuators to operate autonomously.

Figure 5:
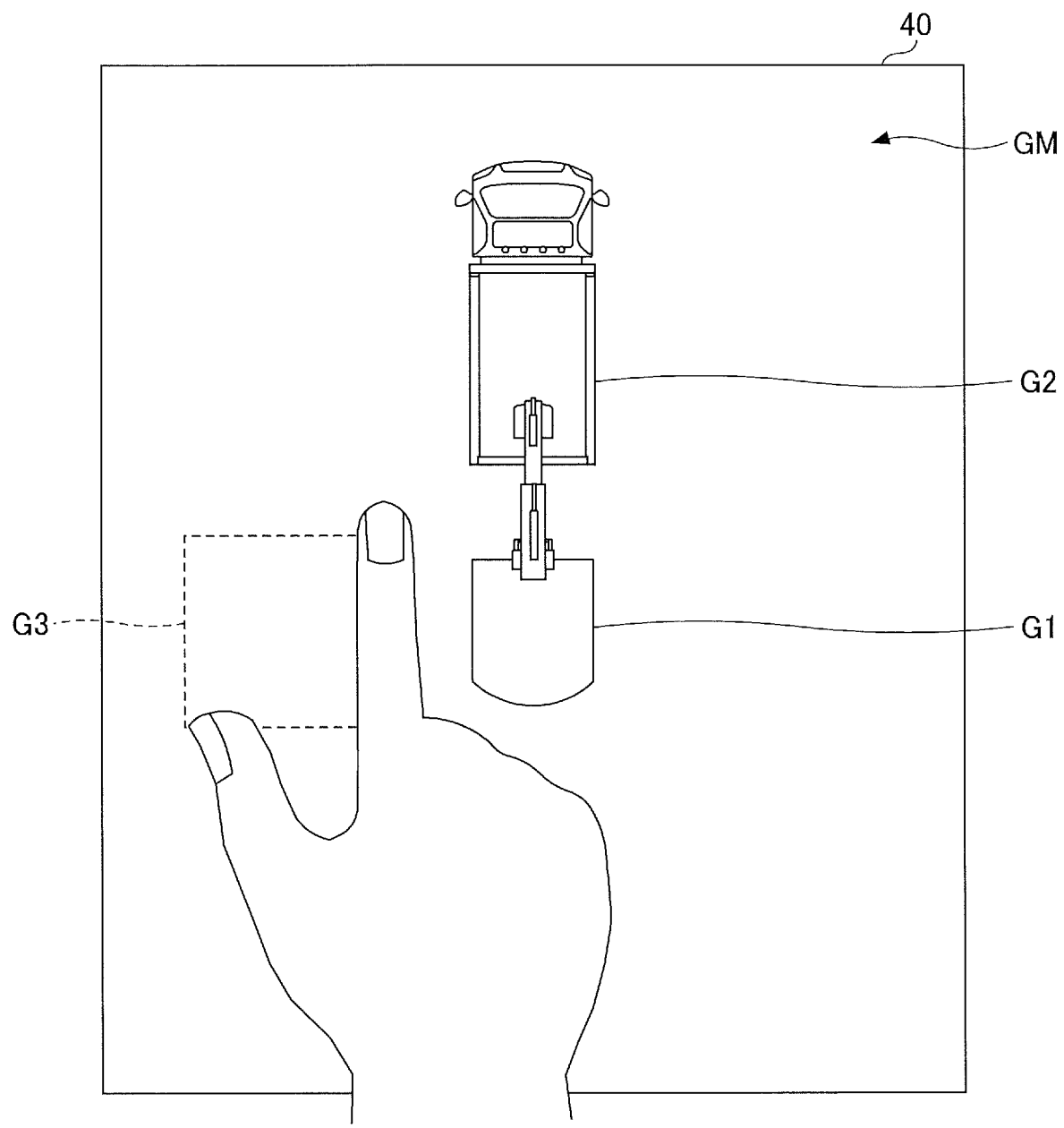
FIG. 5 a diagram illustrating an example of a configuration of a setting screen displayed when setting a target excavation range.
Figure 6:
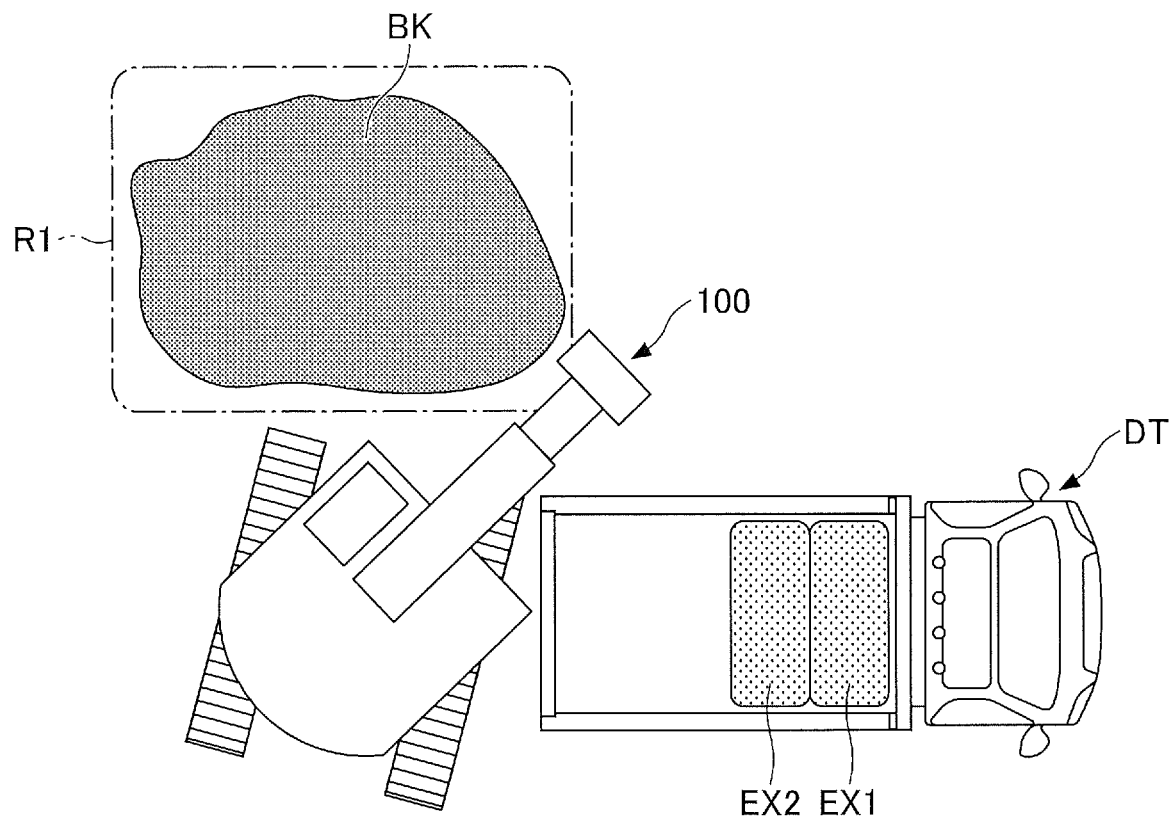
FIG. 6 is a top view of a shovel.

Next, with reference to FIGS. 5 and 6, a process performed by the controller 30 to control the excavation weight in an individual excavation operation will be described. FIG. 5 illustrates an example of a configuration of a setting screen GM displayed on the display device 40 when setting a target excavation range R1. FIG. 6 is a top view of the shovel 100 when excavating excavated matter BK in the target excavation range R1 set on the setting screen GM. In FIG. 6, the shovel 100 excavates the excavated matter BK and loads excavated matter taken in the bucket 6 onto the bed of a dump truck DT. Excavated matter EX1 loaded onto the bed of the dump truck DT corresponds to the matter excavated in the first excavation operation, and excavated matter EX2 corresponds to the matter excavated in the second excavation operation.

The target excavation range R1 is a range set in the surroundings of the shovel 100. The target excavation range R1 is, for example, a three-dimensional range with a restriction in depth. The excavated matter BK to be excavated by the excavation attachment, is ground matter such as, for example, a mound, fills, topsoil, or sediment. The excavated matter BK may be a heap of earth and sand formed by the excavated matter EX that have been put together for loading onto the dump truck DT. In contrast, ground matter outside the target excavation range R1 are not to be excavated by the excavation attachment. Therefore, when the excavation attachment is moved by the autonomous control unit 35, no ground matter outside the target excavation range R1 is excavated.

In an embodiment where the target excavation range R1 is set, the setting unit 34 is configured to set the target trajectory within the target excavation range R1. Therefore, the controller 30 detects the landform within the target excavation range R1, based on the output of the information obtainment device. In the example illustrated in FIGS. 5 and 6, the landform in the target excavation range R1 is detected based on at least one of the outputs of a camera, radar, LIDAR device, and the like.

The controller 30 displays the setting screen GM illustrated in FIG. 5 on the display device 40, for example, when the MC switch is pressed down. The setting screen GM includes a shovel figure G1 and a dump figure G2. The shovel figure G1 is a figure presenting the position and orientation of the revolving upper body 3. The dump figure G2 is a figure presenting the position and orientation of the dump truck DT. The controller 30 recognizes the positional relationship between the shovel 100 and the dump truck DT, for example, based on the outputs of the orientation detection device D1, the positioning device P1, the imaging device S6, and the like, and displays the shovel figure G1 and the dump figure G2 to be consistent with the positional relationship.

A surrounding image may be displayed around the shovel figure G1. In the example in FIG. 5, a surrounding image would be a birds-eye-view image as a composite image generated by applying a viewpoint conversion process to images captured by the rear camera S6B, the forward camera S6F, the left camera S6L, and the right camera S6R. Alternatively, the surrounding image may be computer graphics.

The operator of the shovel 100 may set the target excavation range R1 using the input device 42 while viewing the setting screen GM. In the example in FIG. 5, the operator uses the input device 42 as a touch panel, to set a range figure G3 on the left side of the shovel figure G1. The range figure G3 is a figure presenting the target excavation range R1. Specifically, the operator sets the range figure G3 having a desired size by a pinch-out operation. The operator may set the range figure G3 by a tapping operation. In this case, the range figure G3 is set as a range having a predetermined size, for example, centered on a tapped point.

In the example in FIG. 5, although the range figure G3 is rectangular, it may have another shape, such as a circular or elliptical shape. Also, the range figure G3 may be a figure having a complex outline. In this case, for example, the operator may trace an outline to demarcate a desired range on the touch panel, so as to set the range figure G3 corresponding to the range.

The operator may select one range figure from among multiple range figures displayed in advance on the setting screen GM. Also, the operator may select multiple range figures corresponding to multiple target excavation ranges that are independent from each other. In this case, the excavated matter in the target excavation range may be excavated in the selected order. For example, excavated matter in a target excavation range corresponding to the first selected range figure may be excavated first.

For example, each time the MC switch is pressed down, the controller 30 sets the target trajectory within the target excavation range R1 as described above, and moves the teeth end of the bucket 6 over the excavation start point. Then, in response to a manual operation performed with the arm operation lever, the controller 30 causes at least one of the boom cylinder 7, the arm cylinder 8, and the bucket cylinder 9 to extend or contract so that the trajectory to be drawn by the teeth end of the bucket 6 follows the target trajectory.

In the example in FIG. 6, the controller 30 sets the target trajectory so that the ground in the target excavation range R1 is flush with a virtual plane including the plane where the shovel 100 is positioned. However, the controller 30 may set the target trajectory so that the depth of the ground in the target excavation range R1 becomes a predetermined depth with respect to the virtual plane including the plane where the shovel 100 is positioned. Also, the controller 30 may set the target trajectory so that the tilt angle of the ground in the target excavation range R1 becomes a predetermined angle with respect to the virtual plane including the plane where the shovel 100 is positioned.

In this way, the shovel 100 according to the present disclosure includes the traveling lower body 1, the revolving upper body 3 rotatably mounted on the traveling lower body 1, the excavation attachment attached to the revolving upper body 3, and the controller 30 as a control device. The controller 30 includes the setting unit 34 to set a target trajectory as the trajectory followed by a predetermined part of the excavation attachment, based on information on a landform before the excavation is started and the target excavation volume. With this configuration, the shovel 100 can prevent, for example, excavated matter such as earth and sand from being taken in the bucket more than necessary. Note that the controller 30 may calculate the target excavation volume based on the target excavation weight and soil information.

Also, the controller 30 may include the first information obtaining unit 31 to obtain information on the maximum loadable capacity of a dump truck DT; the second information obtaining unit 32 to obtain information on the excavation weight, which is the weight of excavated matter such as earth and sand excavated in an excavation operation using the excavation attachment; and the calculation unit 33 to calculate a remaining loadable weight based on the information on the maximum loadable capacity and the information on the excavation weight. With this configuration, the shovel 100 can appropriately adjust the excavation weight in an individual excavation operation so that, for example, the total excavation weight by multiple excavation operations becomes equivalent to the maximum loadable capacity of the dump truck DT. Therefore, the shovel 100 can increase the efficiency of excavating operations for loading onto the dump truck DT. Also, the shovel 100 prevents overloading and underloading. Also, the shovel 100 can reduce the workload of the operator of the shovel 100.

Also, the shovel 100 sets the target trajectory so that, for example, the excavation weight in an individual excavation operation does not exceed the remaining loadable weight, to be capable of preventing the excavated matter from being taken in the bucket 6 more than necessary. In other words, the operator of the shovel 100 can adjust the excavation weight before the bucket 6 in a state of having the excavated matter taken in is lifted into the air; therefore, he/she does not need to drop part of the excavated matter to the ground to adjust the excavation weight after the bucket 6 has been lifted and before discharging the excavated matter onto the bed of the dump truck DT. Therefore, the operator of the shovel 100 does not need to perform any extra operation, such as throwing part of the excavated matter taken in the bucket 6 to the ground so that the total weight of the excavated matter to be loaded onto the bed of the dump truck DT does not exceed the maximum loadable capacity.

The first information obtaining unit 31 may be configured to obtain identification information on the dump truck DT, and based on the identification information, to obtain information on the maximum loadable capacity of the dump truck DT. The first information obtaining unit 31 may be configured to obtain the information on the maximum loadable capacity of the dump truck DT, for example, based on the outputs of at least one of the camera, the radar, the LIDAR device, and the like. With this configuration, the shovel 100 can more securely prevent overloading of the excavated matter onto the dump truck DT.

The setting unit 34 may be configured to set the target trajectory within a predetermined target excavation range R1. The target excavation range R1 is typically a region in the surroundings of the revolving upper body 3. In addition, the target excavation range R1 may be set using the input device 42. With this configuration, the operator of the shovel 100 can specify a desired target excavation range, and the controller 30 can control the excavation attachment so that the desired excavated matter is excavated.

In the case where the controller 30 determines that the target trajectory cannot be set properly, the controller 30 may be configured to report the determination. For example, the controller 30 may determine that the target trajectory cannot be properly set in the case where it is determined that the total weight of the excavated matter loaded onto the dump truck DT does not reach the maximum loadable capacity even if excavation operations are performed within the target excavation range R1 until the ground within the target excavation range R1 becomes flat. In this case, the controller 30 may display on the display device 40 information representing that the total weight of the excavated matter loaded onto the dump truck DT does not reach the maximum loadable capacity, and/or may output from the sound output device 43 a sound or voice indicating the information.

The second information obtaining unit 32 may be configured to obtain information on the density of matter excavated by an excavation operation using the excavation attachment. In this case, the setting unit 34 may calculate the remaining loadable volume based on the density information and the remaining loadable weight, to set the target trajectory so as to excavate matter having a volume equivalent to the remaining loadable volume in an individual excavation operation. With this configuration, the shovel 100 can more precisely adjust the excavation weight and excavation volume in an individual excavation operation.

As described above, favorable embodiments according to the present inventive concept have been described in detail. However, the present inventive concept is not restricted to the embodiments described above. Various modifications, substitutions, and the like may be applied to the embodiments described above without deviating from the scope of the present inventive concept. Also, the separately described features can be combined unless a technical inconsistency is introduced.

Figure 7:
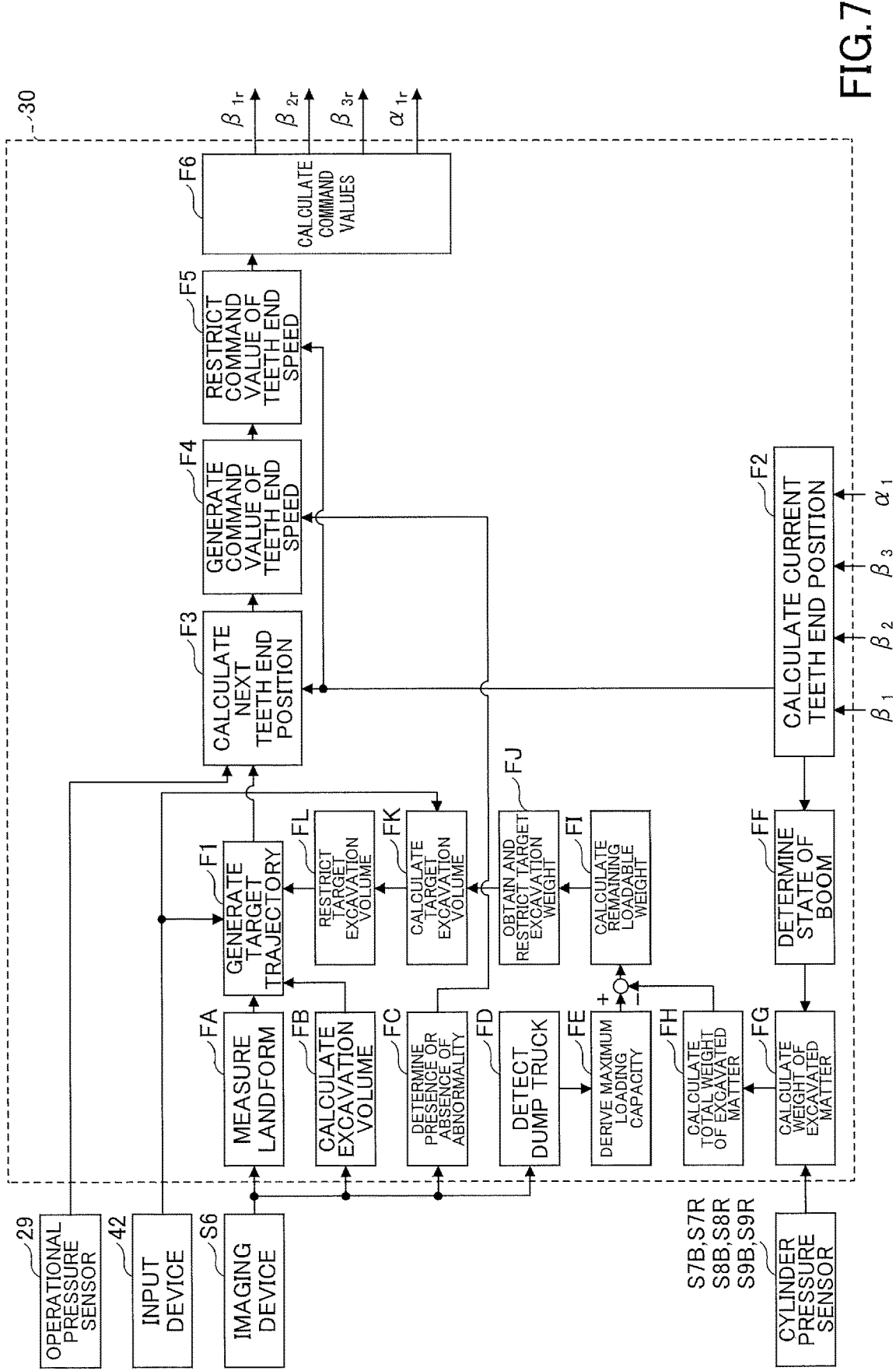
FIG. 7 is a block diagram illustrating an example of a configuration of autonomous control functions.

For example, the shovel 100 may execute autonomous control functions as follows, to autonomously execute composite operations of excavation operations and the like. FIG. 7 is a block diagram illustrating an example of a configuration of autonomous control functions. In the example in FIG. 7, the controller 30 includes functional elements FA to FL and F1 to F6 for executing autonomous control. The functional elements may be implemented by software, may be implemented by hardware, or may be implemented by a combination of software and hardware.

The functional element FA is configured to measure a landform. In the example in FIG. 7, the functional element FA measures the latest state of a landform in the surroundings of the shovel 100, based on images captured by the imaging device S6 as the surroundings monitoring device.

The surroundings monitoring device is configured to detect an object present in the surroundings of the shovel 100. The object may be, for example, a person, an animal, a vehicle, a construction machine, a building, a wall, a fence, a hole, a helmet, a safety vest, work clothes, a predetermined mark on a helmet, or the like. The surroundings monitoring device may be, for example, an ultrasonic sensor, a millimeter-wave radar, a laser radar, or the like.

The surroundings monitoring device may be configured to detect a predetermined object present within a predetermined region set in the surroundings of the shovel 100. In other words, the surroundings monitoring device may be configured to be capable of identifying at least one of the type, position, shape, and the like of an object. For example, the surroundings monitoring device may be configured to distinguish a person from an object other than a person. Also, the surroundings monitoring device may be configured to calculate the distance from the surroundings monitoring device or the shovel 100 to the recognized object.

The functional element FB is configured to calculate the excavation volume. In the example in FIG. 7, the functional element FB calculates the volume of excavated matter that has been actually excavated in an individual excavation operation as the excavation volume, based on images captured by the imaging device S6.

The functional element FC is configured to determine presence or absence of various types of abnormalities. In the example in FIG. 7, the functional element FC is configured to determine presence or absence of abnormalities of the imaging device S6, based on images captured by the imaging device S6. Then, in the case of determining that the state of the imaging device S6 is abnormal, the functional element FC outputs a command to the functional element F4, which will be described later, to slow down or stop the motion of the shovel 100.

The functional element FD is configured to detect a dump truck DT. In the example in FIG. 7, the functional element FD detect a dump truck DT, based on images captured by the imaging device S6.

The functional element FE is configured to derive the maximum loadable capacity of the dump truck DT that has been detected by the functional element FD. In the example in FIG. 7, the functional element FE derives the maximum loadable capacity of the dump truck DT, based on images captured by the imaging device S6. The functional element FE derives the maximum loadable capacity of the dump truck DT, for example, by identifying whether the dump truck DT is a 10-ton truck.

The functional element FF is configured to determine the state of the boom 4. In the example in FIG. 7, the functional element FF determines whether the boom 4 has risen to the height at which the bucket 6 that has taken in the excavated matter has left the ground. This is to detect that the excavation operation has been completed.

Specifically, the functional element FF determines whether the boom 4 has risen to the height at which the bucket 6 that has taken in the excavated matter has left the ground, based on the current position of the teeth end of the bucket 6 calculated by functional element F2, which will be described later. The functional element FF may determine whether the boom 4 has risen to the height at which the bucket 6 that has taken in the excavated matter has left the ground, based on images captured by the imaging device S6.

The functional element FG is configured to calculate the weight of the excavated matter taken in the bucket 6. In the example in FIG. 7, the functional element FG calculates the weight of the excavated matter taken in the bucket 6, based on the outputs of the cylinder pressure sensors in the case where the functional element FF has determined that the boom 4 has risen to the height at which the bucket 6 that has taken in the excavated matter has left the ground. The functional element FG may calculate the weight of the excavated matter taken in the bucket 6, based on the position of the excavation attachment calculated by the functional element F2, which will be described later, and the outputs of the cylinder pressure sensors.

The functional element FH is configured to calculate the total weight of the excavated matter loaded onto the dump truck DT. In the example in FIG. 7, the FH of the functional element calculates the total weight of the excavated matter already loaded onto the bed of the dump truck DT, by adding up the weight of the matter excavated by each excavation operation calculated by the functional element FG.

The functional element FI is configured to calculate the remaining loadable weight. In the example in FIG. 7, the functional element FI calculates the remaining loadable weight, by subtracting the total weight of the excavated matter calculated by functional element FH from the maximum loadable capacity derived by the functional element FE. For example, in the case where the maximum loadable capacity is 10 tons and the total weight of excavated matter already loaded onto the bed of the dump truck DT is 6 tons, the functional element FH calculates 4 tons as the remaining loadable weight.

The functional element FJ is configured to obtain the target excavation weight, which is the weight of the excavated matter to be taken in the bucket 6 in the next excavation operation, and to restrict the obtained value when necessary. In the example in FIG. 7, the functional element FJ performs reading in the storage device 47, to obtain the maximum excavation weight, which is the maximum value of the excavated matter that can be excavated in an individual excavation operation. Then, in the case where the remaining loadable weight calculated by the functional element FI is greater than the maximum excavation weight, the functional element FJ restricts the target excavation weight by the maximum excavation weight. For example, even if the remaining loadable weight is 4 tons, as long as the maximum excavation weight is 3 tons, the functional element FJ outputs 3 tons as the target excavation weight. Note that the maximum excavation weight may be a value that is dynamically input or calculated.

The functional element FK is configured to calculate the target excavation volume. In the example in FIG. 7, the functional element FK calculates the target excavation volume, based on the target excavation weight output by the functional element FJ, and the soil information input through the input device 42. The functional element FK calculates the target excavation volume, for example, based on the target excavation weight and the density of the excavated matter. The functional element FK calculates the target excavation volume, for example, corresponding to the target excavation weight of 3 tons. Basically, even if the target excavation weight is 3 tons, with a smaller density of the excavated matter, the target excavation volume becomes greater.

The functional element FL is configured to restrict the target excavation volume. In the example in FIG. 7, in the case where the target excavation volume calculated by the functional element FK is greater than the maximum excavation volume, the functional element FL restricts the target excavation volume by the maximum excavation volume. For example, even if the target excavation volume is 3 cubic meters, as long as the maximum excavation volume is 2 cubic meters, the functional element FL outputs 2 cubic meters as the target excavation volume. In this way, in order to prevent the excavated matter taken in the bucket 6 from falling off during a subsequent revolution operation or the like, the controller 30 restricts the target excavation volume when necessary. Note that the maximum excavation volume may be a value that is dynamically input or calculated.

The functional element F1 is configured to generate a target trajectory. In the example in FIG. 7, the functional element F1 generates, as the target trajectory, a target trajectory to be followed by the teeth end of the bucket 6, based on the information on the excavation input via the input device 42, the current landform measured by the functional element FA, the actual excavation volume obtained by the past excavation operations calculated by the functional element FB, and the target excavation volume output by the functional element FL. The information on the excavation is, for example, information on predetermined excavation conditions set in advance. An excavating condition may be, for example, the degree of deepness or shallowness.

Typically, the functional element F1 is configured to calculate the target trajectory before each excavation operation is started. In other words, the target trajectory is typically updated before each excavation operation is started. Specifically, the coordinates of the excavation start position as the start point of the target trajectory, and the coordinates of the excavation end position as the end point of the target trajectory are updated before each excavation operation is started.

Figure 8:
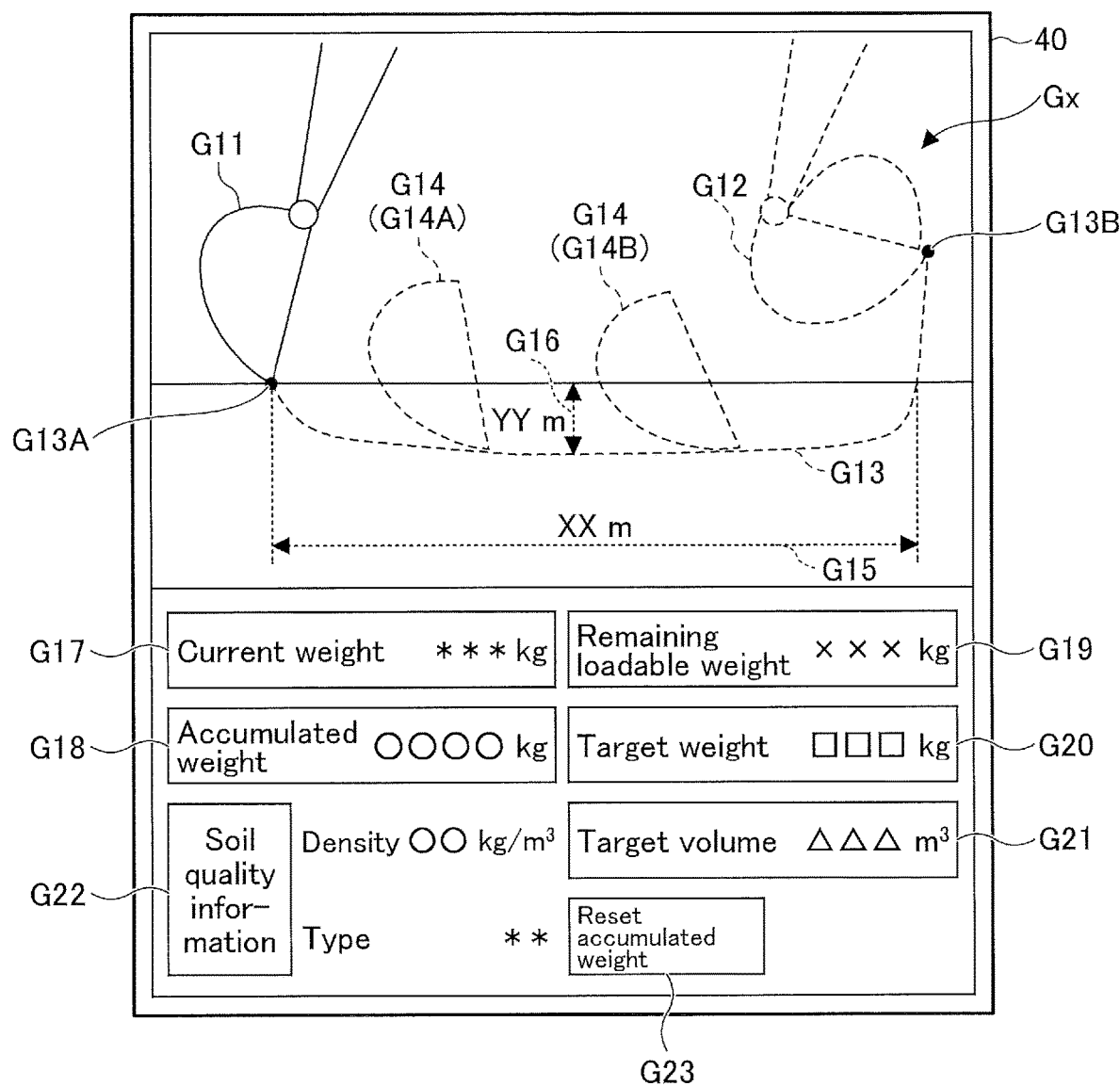
FIG. 8 is a diagram illustrating a display example of an image of a target trajectory.

The functional element F1 may be configured to display an image related to the generated target trajectory on the display device 40. FIG. 8 illustrates an example of display of an image Gx related to a target trajectory displayed by the functional element F1 on the display device 40. The image Gx is an image displayed during the excavation operation and includes figures G11 to G23. The figure G11 presents the current state of the excavation attachment before the excavation operation is started. The figure G12 presents a future state of the excavation attachment after the excavation operation is completed. The figure G13 is a line presenting the target trajectory and includes a figure G13A and a figure G13B. The figure G13A presents the excavation start position, which is the start point of the target trajectory. The figure G13B presents the excavation end position, which is the end point of the target trajectory. In the example in FIG. 8, the excavation end position is the position of the teeth end after the bucket 6 leaves the ground. The figure G14 presents the bucket 6 moving along the target trajectory. In the example in FIG. 8, the figure G14 includes two figures G14A and G14B. The number of figures presenting the bucket 6 in the figure G14 may be one, or may be three or more. The figure G15 is a double-headed arrow presenting the length of the hole excavated by the current excavation operation. The figure G16 is a double-headed arrow presenting the depth of the hole excavated by the current excavation operation. In the example in FIG. 8, the image Gx shows that the hole having a length of XX meters and a depth of YY meters is going to be formed. By viewing the image Gx, the operator of the shovel 100 can easily grasp how the excavation operation will be performed.

The figure G17 presents the current weight of the excavated matter taken in the bucket 6 by an excavation operation currently executed. In the example in FIG. 8, the figure G17 presents that the current weight is "\*\*\* kg". The figure G18 presents the accumulated weight of excavated matter loaded onto the bed of the dump truck DT. In the example in FIG. 8, the figure G18 presents that the accumulated weight is "○○○○ kg". The figure G19 presents the remaining loadable weight. In the example in FIG. 8, the figure G19 presents that the remaining loadable weight (residual weight) is "xxx kg". The figure G20 presents the target excavation weight, which is the weight of the excavated matter to be taken in the bucket 6 by the current excavation operation. In the example in FIG. 8, the figure G20 presents that the target excavation weight (target weight) is "□□□ kg". The figure G21 presents the target excavation volume, which is the volume of the excavated matter to be taken in the bucket 6 by the current excavation operation. In the example in FIG. 8, the figure G21 presents that the target excavation volume (target volume) is "ΔΔΔ m³". The figure G22 presents soil information on the properties of the excavated matter. In the example in FIG. 8, the figure G22 presents that the density of the excavated matter is "○○ kg/m³", and that the type of the excavated matter is "*". The figure G23 presents a button to reset the accumulated weight, as a software button. The button to reset the accumulated weight is configured to reset the accumulated weight when operated. The accumulated weight is normally reset automatically when it is detected that the dump truck DT to which the excavated matter is to be loaded is replaced with another dump truck. However, the operator can reset the accumulated weight at any time by operating the button to reset the accumulated weight.

The functional element F1 may display an image related to the target trajectory on the display device 40, along with at least one of the backward monitoring image and the surroundings monitoring image. The backward monitoring image is an image for enabling the operator to monitor the rear of the shovel 100, which is generated, for example, based on an image captured by the rear camera S6B. The surroundings monitoring image is an image for enabling the operator to monitor the surroundings of the shovel 100, which is for example, a birds-eye-view image as a viewpoint-conversed image that is generated by synthesizing images captured by the rear camera S6B, the left camera S6L, and the right camera S6R, respectively. A birds-eye-view image is typically an image showing how the surroundings of the shovel 100 looks from a virtual point of view right above the shovel 100. For example, the functional element F1 may display on the display device 40 images related to the target trajectory, so as to be adjacent to at least one of the backward monitoring image and the surroundings monitoring image.

Alternatively, the functional element F1 may display an image related to the target trajectory on the display device 40, along with information on the setting state of the shovel 100, which is information on at least one of the engine rpm mode, the traveling mode, the type of attachment, the state of engine control, and the like. Alternatively, the functional element F1 may display an image related to the target trajectory on the display device 40, along with information on the operational state of the shovel, which is information on at least one of the remaining quantity of the urea water, the remaining quantity of the fuel, the temperature of the cooling water, the operation hours of the engine, the cumulative operation hours, and the like.

The functional element F2 is configured to calculate the current position of the teeth end. In the example in FIG. 7, the functional element F2 calculates the coordinate point of the teeth end of the bucket 6 as the current position of the teeth end, based on the boom angle $\beta_1$ detected by the boom angle sensor S1, the arm angle $\beta_2$ detected by the arm angle sensor S2, the bucket angle $\beta_3$ detected by the bucket angle sensor S3, and the angle of revolution $\alpha_1$ detected by the revolutional angular velocity sensor S5. The functional element F2 may use the output of the machine tilt sensor S4 when calculating the current position of the teeth end.

The functional element F3 is configured to calculate the next position of the teeth end. In the example in FIG. 7, the functional element F3 calculates the position of the teeth end after a predetermined period of time as the target position of the teeth end, based on the operation data output by the operating pressure sensor 29, the target track generated by the functional element F1, and the current position of the teeth end calculated by the functional element F2.

The functional element F3 may determine whether the divergence between the current position of the teeth end and the target track is within an allowable range. In the example in FIG. 7, the functional element F3 determines whether the distance between the current position of the teeth end and the target track is less than or equal to a predetermined value. Then, in the case where the distance is less than or equal to the predetermined value, the functional element F3 determines that the divergence is within the allowable range, and calculates the target position of the teeth end. On the other hand, in the case where the distance exceeds the predetermined value, the functional element F3 determines that the divergence is not within the allowable range, and slows down or stops the motion of the actuator regardless of the amount of lever operation.

The functional element F4 is configured to generate a command value related to the speed of the teeth end. In the example in FIG. 7, based on the current position of the teeth end calculated by functional element F2 and the next position of the teeth end calculated by functional element F3, the functional element F4 calculates the speed of the teeth end required for moving the teeth end from the current position to the next position within a predetermined time, as a command value related to the speed of the teeth end.

The functional element F5 is configured to restrict a command value related to the speed of the teeth end. In the example in FIG. 7, based on the current position of the teeth end calculated by the functional element F2 and images captured by the imaging device S6 as the surroundings monitoring device, in the case of determining that the distance between the teeth end and a predetermined object such as a dump truck DT is less than a predetermined value, the functional element F5 restricts the command value related to the speed of the teeth end by a predetermined upper limit. In this way, the controller 30 slows down the speed of the teeth end when the teeth end approaches the predetermined object. The functional element F5 may be configured to change the upper limit based on the weight of excavated matter taken in the bucket 6. Alternatively, the functional element F5 may be configured to change the upper limit based on the turning radius of the excavation attachment. The turning radius of the excavation attachment may be calculated by the functional element F2, or may be calculated by the functional element F5 based on the output of the functional element F2.

The functional element F6 is configured to calculate command values for operating the actuators. In the example in FIG. 7, in order to move the teeth end from the current position to the target position, based on the target position of the teeth end calculated by the functional element F3, the functional element F6 calculates a command value $\beta_{1r}$ related to the boom angle si, a command value $\beta_{2r}$ related to the arm angle $\beta_2$, a command value $\beta_{3r}$ related to the bucket angle $\beta_3$, and a command value air related to the angle of revolution $\alpha_1$. Even when the boom 4 is not operated, the functional element F6 calculates the command value $\beta_{1r}$ when necessary. This is to operate the boom 4 automatically. The same applies to the arm 5, the bucket 6, and the revolution mechanism 2.

Figure 9:
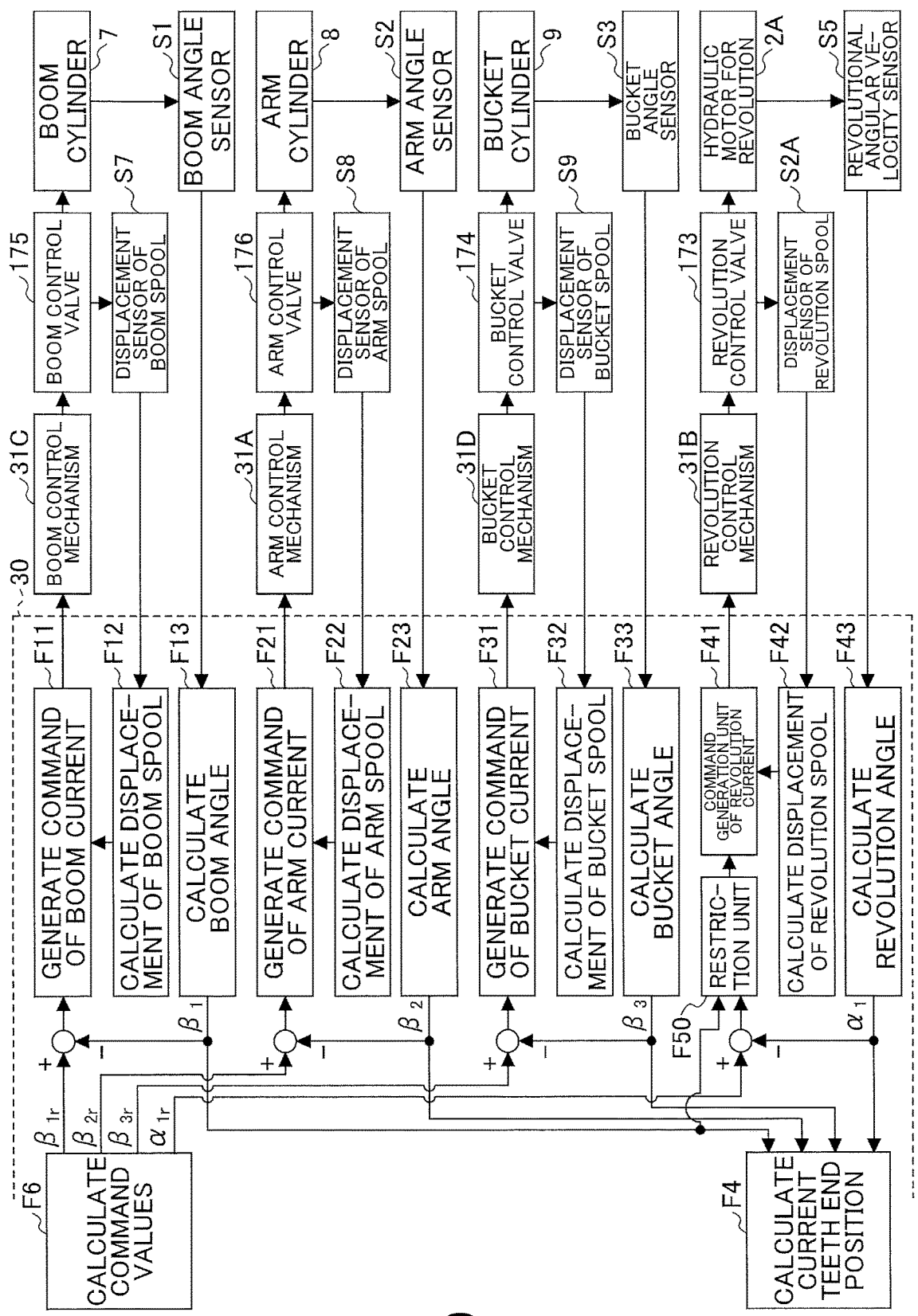
FIG. 9 is a block diagram illustrating an example of a configuration of autonomous control functions.

Next, with reference to FIG. 9, the functional element F6 will be described in detail. FIG. 9 is a block diagram illustrating an example of the configuration of the functional element F6 that calculates various command values.

The controller 30 further includes functional elements F11 to F13, F21 to F23, F31 to F33, F41 to F43, and F50 related to generation of the command values, as illustrated in FIG. 9. The functional elements may be implemented by software, may be implemented by hardware, or may be implemented by a combination of software and hardware.

The functional elements F11 to F13 are functional elements related to the command value $\beta_{1r}$; the functional elements F21 to F23 are functional elements related to the command value $\beta_{2r}$; the functional elements F31 to F33 are functional elements related to the command value $\beta_{3r}$; and the functional elements F41 to F43 are functional elements related to the command value air.

The functional elements F11, F21, F31, and F41 are configured to generate electric current commands output to the actuator control mechanisms. In the present embodiment, the functional element F11 outputs a boom current command to the boom control mechanism 31C; the functional element F21 outputs an arm current command to the arm control mechanism 31A; the functional element F31 outputs a bucket current command to the bucket control mechanism 31D; and the functional element F41 outputs a revolution current command to the revolution control mechanism 31B.

The boom control mechanism 31C is configured to be capable of causing a pilot pressure according to a control current corresponding to a boom cylinder pilot pressure command, to act on the control valve 175 as a boom control valve.

The arm control mechanism 31A is configured to be capable of causing a pilot pressure according to a control current corresponding to an arm cylinder pilot pressure command, to act on the control valve 176 as an arm control valve.

The bucket control mechanism 31D is configured to be capable of causing a pilot pressure according to a control current corresponding to a bucket cylinder pilot pressure command, to act on the control valve 174 as a bucket control valve.

The revolution control mechanism 31B is configured to be capable of causing a pilot pressure according to a control current corresponding to a hydraulic motor for revolution pilot pressure command, to act on the control valve 173 as a revolution control valve.

Each of the functional elements F12, F22, F32, and F42 is configured to calculate the displacement of a spool constituting a spool valve. In the present embodiment, the functional element F12 calculates the amount of displacement of a boom spool constituting the control valve 175 related to the boom cylinder 7, based on the output of a boom spool displacement sensor S7. The functional element F22 calculates the amount of displacement of an arm spool constituting the control valve 176 related to the arm cylinder 8, based on the output of an arm spool displacement sensor 88. The functional element F32 calculates the amount of displacement of a bucket spool constituting the control valve 174 related to the bucket cylinder 9, based on the output of a bucket spool displacement sensor S9. The functional element F42 calculates the amount of displacement of a revolution spool constituting the control valve 173 related to the hydraulic motor for revolution 2A, based on the output of a revolution spool displacement sensor S2A. Note that the boom spool displacement sensor S7 is a sensor that detects the amount of displacement in the spool constituting the control valve 175. The arm spool displacement sensor S8 is a sensor that detects the amount of displacement in the spool constituting the control valve 176. The bucket spool displacement sensor S9 is a sensor that detects the amount of displacement in the spool constituting the control valve 174. In addition, the revolution spool displacement sensor S2A is a sensor that detects the amount of displacement in the spool constituting the control valve 173.

Each of the functional elements F13, F23, F33, and F43 is configured to calculate the angle of rotation of an operating member. In the present embodiment, the functional element F13 calculates the boom angle si based on the output of the boom angle sensor S1. The functional element F23 calculates the arm angle $\beta_2$ based on the output of the arm angle sensor S2. The functional element F33 calculates the bucket angle $\beta_3$ based on the output of the bucket angle sensor S3. The functional element F43 calculates the angle of revolution $\alpha_1$ based on the output of the revolutional angular velocity sensor S5.

Specifically, the functional element F11 basically generates a boom current command to the boom control mechanism 31C so as to make the difference become zero between the command value $\beta_{1r}$ generated by the functional element F6, and the boom angle $\beta_1$ calculated by the functional element F13. At this time, the functional element F11 adjusts the boom current command so as to make the difference become zero between the target boom spool displacement amount derived from the boom current command, and the boom spool displacement amount calculated by the functional element F12. Then, the functional element F11 outputs the adjusted boom current command to the boom control mechanism 31C.

The boom control mechanism 31C changes the opening area according to the boom current command, to cause a pilot pressure corresponding to the size of the opening area to act on the pilot port of the control valve 175. The control valve 175 moves the boom spool according to the pilot pressure to flow hydraulic oil into the boom cylinder 7. The boom spool displacement sensor S7 detects the displacement of the boom spool, and feeds the detection result back to the functional element F12 of the controller 30. The boom cylinder 7 extends or contracts in response to the inflow of the hydraulic oil to move the boom 4 up or down. The boom angle sensor S1 detects the angle of rotation of the boom 4 moving up or down, and feeds the detection result back to the functional element F13 of the controller 30. The functional element F13 feeds the calculated boom angle $\beta_1$ back to the functional element F4.

The functional element F21 basically generates an arm current command to the arm control mechanism 31A so as to make the difference become zero between the command value $\beta_{2r}$ generated by the functional element F6, and the arm angle $\beta_2$ calculated by the functional element F23. At this time, the functional element F21 adjusts the arm current command so as to make the difference become zero between the target arm spool displacement amount derived from the arm current command, and the arm spool displacement amount calculated by the functional element F22. Then, the functional element F21 outputs the adjusted arm current command to the arm control mechanism 31A.

The arm control mechanism 31A changes the opening area according to the arm current command, to cause a pilot pressure corresponding to the size of the opening area to act on the pilot port of the control valve 176. The control valve 176 moves the arm spool according to the pilot pressure to flow hydraulic oil into the arm cylinder 8. The arm spool displacement sensor S8 detects the displacement of the arm spool, and feeds the detection result back to the functional element F22 of the controller 30. The arm cylinder 8 extends or contracts in response to the inflow of the hydraulic oil to open or close the arm 5. The arm angle sensor S2 detects the angle of rotation of the arm 5 to be opened or closed, and feeds the detection result back to the functional element F23 of the controller 30. The functional element F23 feeds the calculated arm angle $\beta_2$ back to the functional element F4.

The functional element F31 basically generates a bucket current command to the bucket control mechanism 31D so as to make the difference become zero between the command value $\beta_{3r}$ generated by the functional element F6, and the bucket angle $\beta_3$ calculated by the functional element F33. At this time, the functional element F31 adjusts the bucket current command so as to make the difference become zero between the target bucket spool displacement amount derived from the bucket current command, and the bucket spool displacement amount calculated by the functional element F32. Then, the functional element F31 outputs the adjusted bucket current command to the bucket control mechanism 31D.

The bucket control mechanism 31D changes the opening area according to the bucket current command, to cause a pilot pressure corresponding to the size of the opening area to act on the pilot port of the control valve 174. The control valve 174 moves the bucket spool according to the pilot pressure to flow hydraulic oil into the boom cylinder 7. The bucket spool displacement sensor S9 detects the displacement of the bucket spool, and feeds the detection result back to the functional element F32 of the controller 30. The bucket cylinder 9 extends or contracts in response to the inflow of the hydraulic oil to open or close the bucket 6. The bucket angle sensor S3 detects the angle of rotation of the bucket 6 to be opened or closed, and feeds the detection result back to the functional element F33 of the controller 30. The functional element F33 feeds the calculated bucket angle $\beta_3$ back to the functional element F4.

The functional element F41 basically generates a revolution current command to the revolution control mechanism 31B so as to make the difference become zero between the command value air generated by the functional element F6, and the angle of revolution $\alpha_1$ calculated by the functional element F43. At this time, the functional element F41 adjusts the revolution current command so as to make the difference become zero between the target revolution spool displacement amount derived from the revolution current command, and the revolution spool displacement amount calculated by the functional element F42. Then, the functional element F41 outputs the adjusted revolution current command to the revolution control mechanism 31B. Note that the difference between the command value air generated by the functional element F6 and the angle of revolution $\alpha_1$ calculated by the functional element F43 may be restricted by the restriction unit F50 before input into the functional element F41.

The restriction unit F50 is configured to determine whether the boom 4 has risen to a predetermined height (angle) based on the boom angle $\beta_1$ calculated by the functional element F13. Then, if it is determined that the boom 4 has not risen to the predetermined height (angle), the restriction unit F50 is configured to restrict the difference between the command value $\alpha_{1r}$ and the angle of revolution $\alpha_1$, which is a difference to be output to the functional element F41, to be less than or equal to a predetermined value. This is to prevent the revolving upper body 3 from revolving abruptly when the boom 4 has not risen sufficiently.

The revolution control mechanism 31B changes the opening area according to the revolution current command, to cause a pilot pressure corresponding to the size of the opening area to act on the pilot port of the control valve 173. The control valve 173 moves the revolution spool according to the pilot pressure to flow hydraulic oil into the boom cylinder 7. The revolution spool displacement sensor S2A detects the displacement of the revolution spool, and feeds the detection result back to the functional element F42 of the controller 30. The hydraulic motor for revolution 2A rotates in response to the inflow of hydraulic oil to revolve the revolving upper body 3. The revolutional angular velocity sensor S5 detects the angle of revolution of the revolving upper body 3, and feeds the detection result back to the functional element F43 of the controller 30. The functional element F43 feeds the calculated angle of revolution $\alpha_1$ back to the functional element F4.

As described above, the controller 30 is configured to include a three-stage feedback loop for each operating member. In other words, the controller 30 is configured to include a feedback loop related to the spool displacement amount, a feedback loop related to the angle of rotation of the operating member, and a feedback loop related to the position of the teeth end. Therefore, the controller 30 can control the motion of the teeth end of the bucket 6 with high accuracy during autonomous control.

Figure 10:
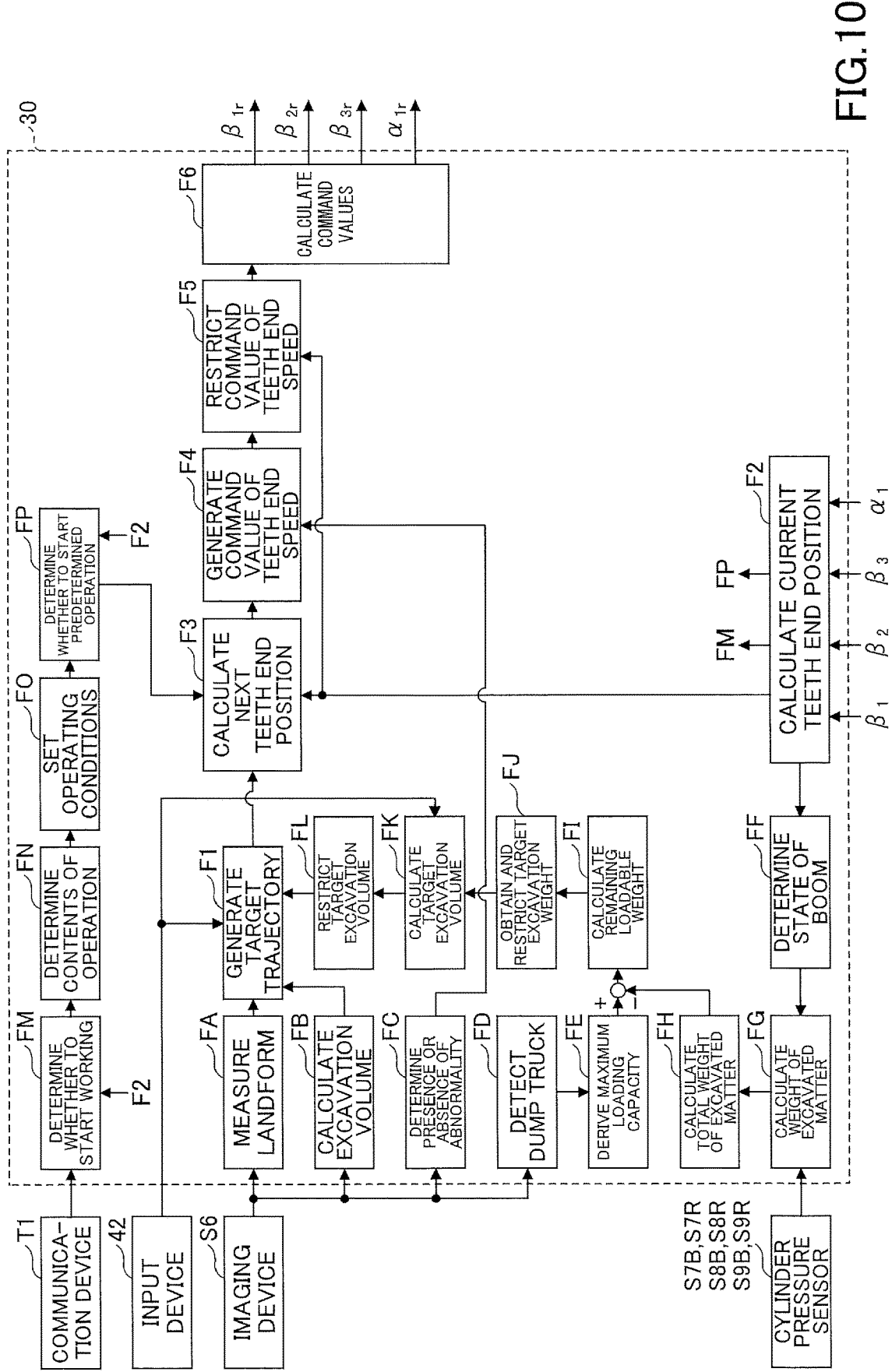
FIG. 10 is a block diagram illustrating another example of a configuration of autonomous control functions.

Next, with reference to FIG. 10, another example of the configuration of the autonomous control function will be described. FIG. 10 is a block diagram illustrating another example of a configuration of autonomous control functions. The configuration illustrated in FIG. 10 includes functional elements for operating an automatically-operative unmanned shovel, and in this regard, differs from the configuration illustrated in FIG. 7 that includes functional elements for operating a manually-operative manned shovel. Specifically, the configuration illustrated in FIG. 10 calculates the next position of the teeth end based on the output of the communication device T1 instead of the output of the operating pressure sensor 29, and includes functional elements FM to FP; thus, in these regards, differs from the configuration illustrated in FIG. 7. Therefore, in the following, description will be omitted for parts that are common to the configuration illustrated in FIG. 7, and different parts will be described in detail.

The communication device T1 is configured to control communication between the shovel 100 and an external device external to the shovel 100. In the example in FIG. 10, the communication device T1 is configured to output a start command to the functional element FM, based on a signal received from the external device. The communication device T1 may be configured to output operational data to the functional element FM, based on a signal received from the external device. However, the communication device T1 may be the input device 42 installed in the shovel 100.

The functional element FM is configured to determine whether to start the work. In the example in FIG. 10, the functional element FM is configured to determine that the start of the work is instructed when a start command is received from the communication device T1, so as to output a start command to the functional element FN. In the case of receiving a start command from the communication device T1, if it is possible to determine that no object is present in the surroundings of the shovel 100 based on the output of the imaging device S6 as the surroundings monitoring device, the functional element FM may be configured to output a start command to the functional element FN. When outputting the start command to the functional element FN, the functional element FM may output a command to a solenoid valve arranged on a pilot line that connects the pilot pump 15 and the control valve 17, to open the pilot line.

The functional element FN is configured to determine the contents of operations. In the example in FIG. 10, in the case of receiving a start command from the functional element FM, the functional element FN is configured to determine which operation among an excavation operation, a boom-up revolving operation, an earth removal operation, and a boom-down revolving operation, and the like is being performed, or whether no operation is being performed, based on the current position of the teeth end calculated by the functional element F2. Then, the functional element FN is configured to output a start command to the functional element FO if it is determined that the boom-down revolving operation is completed based on the current position of the teeth end calculated by the functional element F2.

The functional element FO is configured to set the operational conditions of the shovel 100. In the example in FIG. 10, the functional element FO is configured to set the operational conditions such as the excavation depth (deep or shallow), excavation length, and the like when performing the excavation operation by autonomous control, in the case of receiving the start command from the functional element FN. In addition, the functional element FO is configured to output the start command to the functional element FP after setting the operational conditions.

The functional element FP is configured to determine whether to start a predetermined operation. In the example in FIG. 10, in the case of receiving the start command from the functional element FO, the functional element FP determines whether it is possible to start the excavation operation based on the current position of the teeth end of the bucket 6 calculated by the functional element F2. Specifically, based on the current position of the teeth end, the functional element FP determines whether the boom-down revolving operation is completed and whether the teeth end of the bucket 6 reaches the excavation start position. Then, the functional element FP determines that it is possible to start the excavation operation if it is determined that the boom-down revolving operation is completed and the teeth end of the bucket 6 reaches the excavation start position. Then, when it is determined that it is possible to start the excavation operation, the functional element FP causes operation data automatically generated in the automatic operation unmanned shovel to be fed into the functional element F3.

With this configuration, the controller 30 can perform excavation operations by autonomous control with an automatically-operative unmanned shovel, as with a manually-operative manned shovel.

Also, the embodiments described above disclose a hydraulic operation system provided with a hydraulic pilot circuit. Specifically, in the hydraulic pilot circuit related to the arm operation lever, hydraulic oil fed from the pilot pump 15 to the arm operation lever is transferred to the pilot port of the control valve 176 as the arm control valve, at a flow rate depending on the opening of a remote control valve that is opened or closed by tilting the arm operation lever.

However, instead of such a hydraulic operation systems provided with hydraulic pilot circuits, an electric operation system provided with electric operation levers may be adopted. In this case, the operational amount of each electric operation lever is input into the controller 30 as an electric signal. Also, a solenoid valve is arranged between the pilot pump 15 and the pilot port of each of the control valves. The solenoid valve is configured to operate in response to an electric signal from the controller 30. With this configuration, when a manual operation is performed using an electric operation lever, the controller 30 can control the solenoid valve to increase or decrease the pilot pressure by an electric signal corresponding to the operational amount of the lever, to move each of the control valves among the control valves 17. Note that each control valve may be constituted with a solenoid spool valve. In this case, the solenoid spool valve operates in response to an electric signal from the controller 30 corresponding to the amount of lever operation on the electric operation lever.

Figure 11:
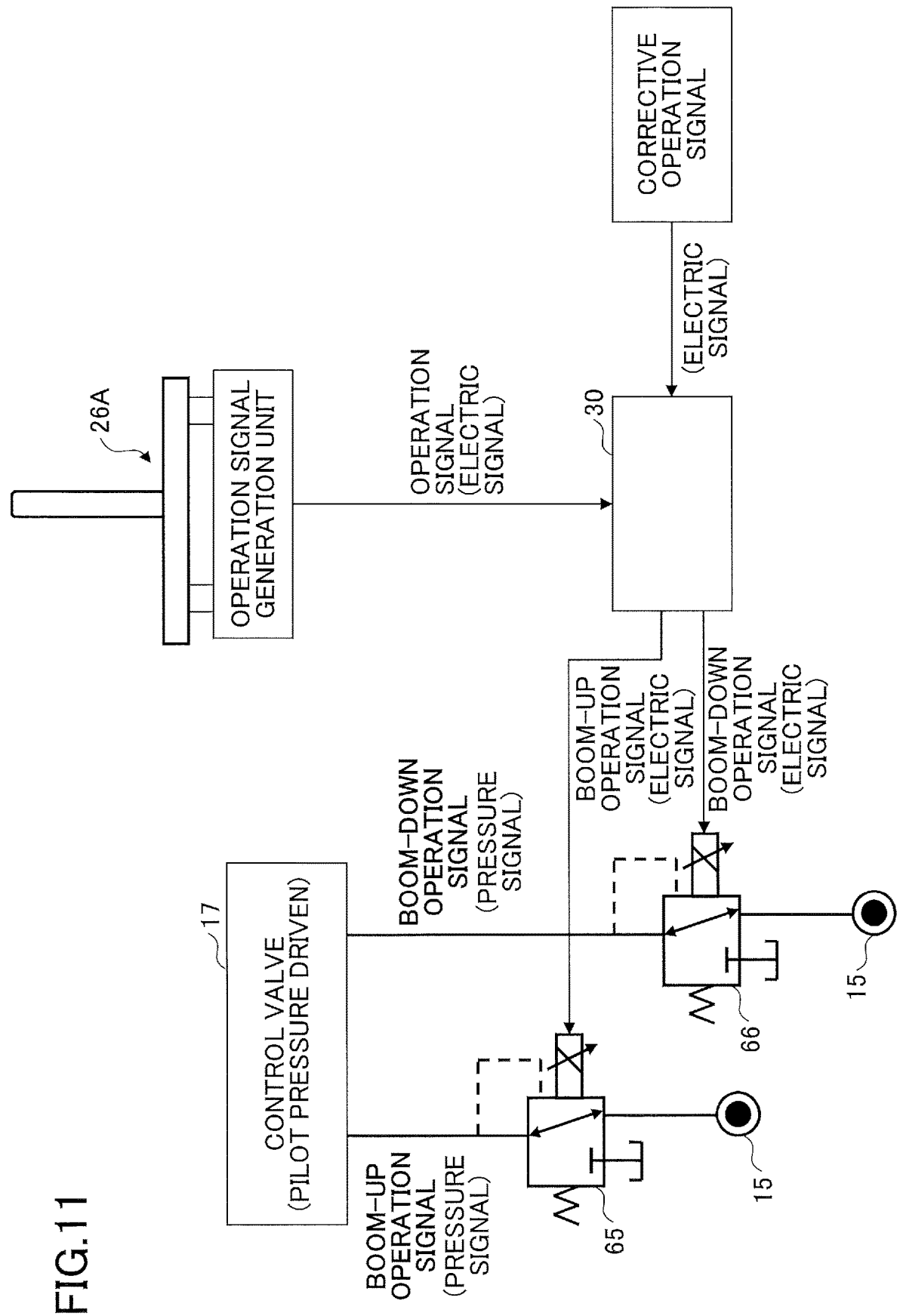
FIG. 11 is a diagram illustrating an example of a configuration of an electric operation system.

In the case of adopting such an electric control system including electric operation lever, the controller 30 can perform autonomous control functions more easily compared to the case of adopting a hydraulic actuation system including hydraulic operation levers. FIG. 11 is a diagram illustrating an example of a configuration of an electric operation system. Specifically, the electric operation system in FIG. 11 is an example of a boom operation system, which is primarily constituted with a pilot-pressure-actuated control valve 17, a boom operation lever 26A as an electric operation lever, a controller 30, a solenoid valve 65 for a boom-up operation, and a solenoid valve 66 for a boom-down operation. The electric operation system in FIG. 11 may also be applied to an arm operation system, a bucket operation system, and the like.

The pilot-pressure-actuated control valve 17 include a control valve 175 (see FIG. 2) related to the boom cylinder 7, a control valve 176 (see FIG. 2) related to the arm cylinder 8, and a control valve 174 (see FIG. 2) related to the bucket cylinder 9, and the like. The solenoid valve 65 is configured to be capable of adjusting the flow area of a pipeline connecting the pilot pump 15 to the upside pilot port of the control valve 175. The solenoid valve 66 is configured to be capable of adjusting the flow area of a pipeline connecting the pilot pump 15 to the downside pilot port of the control valve 175.

In the case where a manual operation is performed, the controller 30 generates a boom-up operation signal (an electric signal) or a boom-down operation signal (an electric signal) in response to an operation signal (an electric signal) output by the operation signal generator of the boom operation lever 26A. The operation signal output by the operation signal generator of the boom operation lever 26A is an electric signal that varies according to the operational amount and the operational direction of the boom operation lever 26A.

Specifically, in the case where the boom operation lever 26A is operated in the boom-up direction, the controller 30 outputs a boom-up operation signal (an electric signal) corresponding to the operational amount of the lever to the solenoid valve 65. The solenoid valve 65 adjusts the flow area in response to the boom-up operation signal (an electric signal) to control the pilot pressure as a boom-up operation signal (a pressure signal) acting on the upside pilot port of the control valve 175. Similarly, in the case where the boom operation lever 26A is operated in the boom-down direction, the controller 30 outputs a boom-down operation signal (an electric signal) corresponding to the operational amount of the lever to the solenoid valve 66. The solenoid valve 66 adjusts the flow area in response to the boom-down operation signal (an electric signal) to control the pilot pressure as a boom-down operation signal (a pressure signal) acting on the downside pilot port of the control valve 175.

In the case of performing autonomous control, the controller 30 generates a boom-up operation signal (an electric signal) or a boom-down operation signal (an electric signal) in response to, for example, a corrective operation signal (an electric signal) instead of an operation signal output by the operation signal generator of the boom operation lever 26A. The corrective operation signal may be an electric signal generated by the controller 30, or an electric signal generated by an external control device or the like other than the controller 30.

In the embodiments illustrated in FIGS. 7 and 10, the controller 30 is configured to calculate the target excavation weight based on the maximum loadable capacity onto a dump truck DT, convert the target excavation weight to the target excavation volume, and then, generate the target trajectory. However, the work to which this configuration is applied is not necessarily restricted to the loading work onto the dump truck DT. For example, in backfilling work, the controller 30 may calculate a target excavation volume, based on the volume of an opening such as a hole to be backfilled. In this case, the controller 30 may calculate a trajectory formed when scooping up temporarily-placed earth and sand as the target trajectory. Then, the controller 30 may calculate the target excavation volume based on the difference between the volume of the opening and the cumulative volume of the backfilled earth and sand.

The information obtained by the shovel 100 may be shared with a manager, other shovel operators, and the like through a shovel management system SYS as illustrated in FIG. 12. FIG. 12 is a schematic view illustrating an example of a configuration of the shovel management system SYS. The shovel management system SYS is a system to manage one or more shovels 100. In the present embodiment, the management system SYS is primarily constituted with shovels 100, a support device 200, and a management device 300. There may one or more units of the shovels 100, the support device 200, and the management device 300 that constitute the management system SYS. In the example in FIG. 12, the management system SYS includes one shovel 100, one support device 200, and one management device 300.

The support device 200 is typically a portable terminal device, such as a notebook PC, a tablet PC, or a smartphone carried by an operator or the like present on a construction site. The support device 200 may be a computer carried by an operator of the shovel 100. The support device 200 may be a fixed terminal device.

The management device 300 is typically a fixed terminal device, for example, a server computer installed in a management center or the like outside a construction site. The management device 300 may be a portable computer (e.g., a portable terminal device such as a notebook PC, tablet PC, or smartphone).

At least one of the support device 200 and the management device 300 may be equipped with a monitor and an operation device for remote control. In this case, the operator may operate the shovel 100 by using the operation device for remote control. The operation device for remote control is connected to the controller 30, for example, through a communication network such as a wireless communication network. In the following, although exchange of information between the shovel 100 and the management device 300 will be described, the following description applies similarly to exchange of information between the shovel 100 and the support device 200.

In the management system SYS of the shovel 100 as described above, the controller 30 of the shovel 100 may transmit information on at least one of the time and place when the autonomous control is started or stopped, the target trajectory used during the autonomous control; the trajectory actually followed by the predetermined part during the autonomous control; and the like, to the management device 300. At this time, the controller 30 may transmit to the management device 300, for example, an image captured by the imaging device S6 as the surroundings monitoring device. The image may be multiple images captured during a predetermined period of time including the period during which the autonomous control was performed. Further, the controller 30 may transmit information on at least one of data related to the contents of operations of the shovel 100 during a predetermined period of time including the period during which the autonomous control was performed; data related to the position of the shovel 100; data related to the position of the excavation attachment; and the like, to the management device 300. This is to enable the manager using the management device 300 to obtain the information on the worksite. The data related to the contents of the operations of the shovel 100 is at least one of the number of loading operations performed as the earth removal operation; information on excavated matter such as earth and sand loaded onto the bed of the dump truck DT; the type of the dump truck DT related to the loading operations; information on the position of the shovel 100 when the loading operations were performed; information on the working environment; information on the operations of the shovel 100 when the loading operations were being performed; and the like. The information on the excavated matter is at least one of the weight and type of the matter excavated in each excavation operation; the weight and type of the excavated matter loaded onto the dump truck DT; the weight and type of the excavated matter loaded in the loading work for the day. The information on the working environment is, for example, information on the slope of the ground in the surroundings of the shovel 100, information on the weather in the surroundings of the work site. The information on the operations of the shovel 100 is, for example, at least one of the output of the operating pressure sensor 29 and the outputs of the cylinder pressure sensors.

Also, in the embodiments described above, the autonomous control unit 35 is configured to autonomously support a manual operation of the shovel 100 performed by the operator. For example, the autonomous control unit 35 causes at least one of the boom cylinder 7, the arm cylinder 8, and the bucket cylinder 9 to extend or contract, so that the trajectory of the teeth end of the bucket 6 becomes equivalent to the target trajectory when the operator manually performs an arm-closing operation. However, the present invention is not limited to this configuration. The autonomous control unit 35 may cause at least one of the boom cylinder 7, the arm cylinder 8, and the bucket cylinder 9 to extend or contract so that the trajectory of the teeth end of the bucket 6 becomes equivalent to the target trajectory, for example, when the operator is not operating the operating device 26. In other words, the autonomous control unit 35 may operate the excavation attachment autonomously without an operation performed by the operator.

Also, in the embodiments described above, a boom-up revolving operation and an earth removal operation after an excavation operation is performed in response to a manual operation performed by the operator of the shovel 100; however, these operations may be performed by the autonomous control unit 35. The same applies to a boom-down revolving operation after an earth removal operation.

What is claimed is:

1. A shovel comprising:
   a traveling lower body;
   a revolving upper body rotatably installed on the traveling lower body;
   an excavation attachment attached to the revolving upper body; and
   a control device including a memory and a processor, wherein the processor sets a target trajectory as a trajectory to be followed by a predetermined part of the excavation attachment, based on information on a landform before excavation is started, and a target excavation volume;
   wherein the processor calculates the target excavation volume every time before an individual excavation operation is performed, and resets the target trajectory based on information on a landform every time before the individual excavation operation is performed, and the calculated target excavation volume, and
   wherein the target excavation volume is a volume of excavated matter to be taken in the bucket by the individual excavation operation, and is less than a maximum volume of the excavated matter that can be excavated in the individual excavation operation.

2. The shovel as claimed in claim 1, wherein the processor calculates the target excavation volume based on a target excavation weight and soil information.

3. The shovel as claimed in claim 1, wherein the processor obtains information on a maximum loadable capacity of a dump truck,
   obtains information on an excavation weight, which is a weight of matter excavated in an excavation operation using the excavation attachment, and
   calculates a target excavation weight based on the information on the maximum loadable capacity and the information on the excavation weight.

4. The shovel as claimed in claim 3, wherein the processor obtains identification information on the dump truck, and based on the identification information, to obtain the information on the maximum loadable capacity.

5. The shovel as claimed in claim 3, wherein the processor obtains the information on the maximum loadable capacity, based on output of at least one of a camera, a radar, and a LIDAR device.

6. The shovel as claimed in claim 3, wherein the processor obtains information on a density of the matter excavated in the excavation operation using the excavation attachment, and
   wherein the processor calculates a remaining loadable volume based on a remaining loadable weight and the density, to set the target trajectory so as to excavate the matter having a volume equivalent to the remaining loadable volume in an individual excavation operation.

7. The shovel as claimed in claim 1, wherein the processor sets the target trajectory within a predetermined target excavation range.

8. The shovel as claimed in claim 7, further comprising:
   an input device including at least one of a touch panel, a microphone, a knob switch, and a membrane switch, wherein the input device is configured to allow an operator to input various items of information into the control device,
   wherein the target excavation range is a region in surroundings of the revolving upper body, and set using the input device.

9. The shovel as claimed in claim 1, wherein upon determining that the target trajectory cannot be set properly, the control device is configured to report the determination.

10. The shovel as claimed in claim 1, wherein the target trajectory is a trajectory that includes a curved part formed by a rotational movement of the excavation attachment.

11. The shovel as claimed in claim 1, wherein the target trajectory includes a trajectory of a lifting-up operation.

12. The shovel as claimed in claim 1, wherein the target excavation volume is calculated based on a volume of an opening.

13. The shovel as claimed in claim 1, wherein the target excavation volume is calculated based on a difference between a volume of an opening and a cumulative volume of backfilled earth and sand.

* * * * *